US 9,253,677 B2

(12) United States Patent
Siomina

(10) Patent No.: US 9,253,677 B2
(45) Date of Patent: Feb. 2, 2016

(54) METHODS AND APPARATUS FOR ENHANCING NETWORK POSITIONING MEASUREMENT PERFORMANCE BY MANAGING UNCERTAIN MEASUREMENT OCCASIONS

(71) Applicant: Telefonaktiebolaget L M Ericsson (PUBL), Stockholm (SE)

(72) Inventor: Iana Siomina, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 100 days.

(21) Appl. No.: 13/859,543

(22) Filed: Apr. 9, 2013

(65) Prior Publication Data

US 2013/0303199 A1 Nov. 14, 2013

Related U.S. Application Data

(60) Provisional application No. 61/621,924, filed on Apr. 9, 2012.

(51) Int. Cl.
*H04W 24/00* (2009.01)
*H04W 24/10* (2009.01)
(Continued)

(52) U.S. Cl.
CPC ............... *H04W 24/10* (2013.01); *G01S 5/021* (2013.01); *G01S 5/06* (2013.01); *H04L 5/0005* (2013.01); *H04L 5/0053* (2013.01); *H04W 64/00* (2013.01); *H04W 76/048* (2013.01)

(58) Field of Classification Search
CPC ........ H04W 64/00; H04W 4/02; H04W 24/00
USPC .................................. 455/456.1, 456.5, 67.11
See application file for complete search history.

(56) References Cited

U.S. PATENT DOCUMENTS 8,462,736 B2 * 6/2013 Kazmi et al. ................... 370/332
2010/0317343 A1 12/2010 Krishnamurthy et al.
(Continued)

FOREIGN PATENT DOCUMENTS

WO 2009154527 A1 12/2009
WO 2011139201 A1 11/2011

OTHER PUBLICATIONS

Notification of Transmittal of the International Search Report and the Written Opinion of the International Searching Authority, issued in International application No. PCT/IB2013/052828 on Nov. 6, 2013, 12 pages.

*Primary Examiner* — Temica M Beamer
(74) *Attorney, Agent, or Firm* — Rothwell, Figg, Ernst & Manbeck, P.C.

(57) ABSTRACT

Method and apparatus for enhancing network positioning measurement performance, wherein uplink measurement is a measurement performed on radio signals configured for a wireless device by a first network node, and wherein the first network node is different from a measuring node. Information is obtained about a plurality of measurement occasions in which the wireless device is scheduled to transmit one or more configured radio signals, wherein a measurement occasion comprises one or more time and/or frequency resources. Information is also obtained about uncertain measurement occasions, wherein an uncertain measurement occasion comprises one of the plurality of measurement occasions in which the wireless device may or may not transmit the one or more configured radio signals. A radio signal measurement is selectively performed based on the obtained information and the radio signals received from the wireless device, and is used for determining positioning of the wireless device.

39 Claims, 8 Drawing Sheets

(51) Int. Cl.
*H04W 64/00* (2009.01)
*G01S 5/02* (2010.01)
*G01S 5/06* (2006.01)
*H04L 5/00* (2006.01)
*H04W 76/04* (2009.01)

(56) References Cited

U.S. PATENT DOCUMENTS

2010/0323720 A1  12/2010  Jen
2011/0039578 A1*  2/2011  Rowitch et al. ............ 455/456.1

* cited by examiner

METHODS AND APPARATUS FOR ENHANCING NETWORK POSITIONING MEASUREMENT PERFORMANCE BY MANAGING UNCERTAIN MEASUREMENT OCCASIONS

CROSS-REFERENCE TO RELATED APPLICATIONS

The present application claims priority benefit under 35 U.S.C. §119(e) of U.S. Provisional Patent Application No. 61/621,924, entitled "Enhancing UL Measurement Performance by Managing Uncertain Measurement Occasions," filed Apr. 9, 2012, the contents of which are incorporated herein by reference in their entirety.

TECHNICAL FIELD

The present invention relates generally to communication across a network and, more particularly, to methods and apparatus for enhancing network positioning measurement performance by managing uncertain measurement occasions.

BACKGROUND

The Universal Mobile Telecommunication System (UMTS) is one of the third generation mobile communication technologies designed to succeed GSM. Long Term Evolution (LTE) is a project within the $3^{rd}$ Generation Partnership Project (3GPP) for improving the UMTS standard to cope with future requirements in terms of improved communication services such as higher data rates, improved efficiency, and lower costs. The Universal Terrestrial Radio Access Network (UTRAN) is the radio access network of a UMTS, and Evolved UTRAN (E-UTRAN) is the radio access network of a LTE system. In a UTRAN and E-UTRAN, a user equipment (UE) device is wirelessly connected to a Base Station (BS), commonly referred to as a NodeB or an evolved NodeB (eNodeB). Each BS serves one or more areas referred to as cells.

The possibility of identifying the geographical location of users in the wireless networks has enabled a large variety of commercial and non-commercial services, e.g., navigation assistance, social networking, location-aware advertising, and emergency services. Different services may have different positioning accuracy requirements imposed by the application. Furthermore, some regulatory requirements on the positioning accuracy for basic emergency services exist in some countries, such as E911 from the Federal Communications Commission (FCC) in the United States and the corresponding E112 standard in Europe.

In many environments, a user's position may be accurately estimated by using positioning methods based on Global Positioning System (GPS). However, GPS is known to be associated with high costs due to higher UE complexity, a relatively long time to a first positioning fix, and a high UE device energy consumption due to a need for large computational resources, resulting in rapid battery drain. Today's networks often have the capability to assist UE devices to improve the terminal receiver's sensitivity and the GPS startup performance through Assisted-GPS (A-GPS) positioning. However, GPS and A-GPS receivers are not necessarily available in all wireless UEs, and some wireless communications systems do not support A-GPS. Furthermore, GPS-based positioning may often have unsatisfactory performance in urban canyons and indoor environments. There is, therefore, a need for complementary terrestrial positioning methods.

There are a number of existing different terrestrial positioning methods. One example is Observed Time Difference of Arrival (OTDOA) in LTE. Three key network elements in a LTE positioning architecture are the Location Services (LCS) Client, the LCS target, and the LCS Server. The LCS Server is a physical or logical entity managing positioning for a LCS target by collecting measurements and other location information, assisting the UE in performing measurements when necessary, and estimating the LCS target location. A LCS Client is a software and/or hardware entity that interacts with a LCS Server for the purpose of obtaining location information for one or more LCS targets. The LCS target is the entity that is being positioned. LCS Clients may reside in the LCS targets themselves. In the positioning procedure, a LCS Client sends a positioning request to a LCS Server to obtain location information, and the LCS Server processes and serves the received request and sends the positioning result and, optionally, a velocity estimate to the LCS Client. The positioning request may originate from the UE or the network.

In LTE, there exist two positioning protocols operating via the radio network: the LTE Positioning Protocol (LPP) and the LTE Positioning Protocol annex (LPPa). The LPP is a point-to-point protocol between the LCS server and the LCS target, used for the positioning of the LCS target. LPP may be used both in a user plane and in a control plane positioning procedure; and multiple LPP procedures are allowed in series and/or in parallel, thereby reducing latency. LPPa is a protocol between the eNodeB and the LCS server specified only for control plane positioning procedures, although it still may assist user plane positioning by the querying of eNodeBs for information and measurements. A Secure User Plane Location (SUPL) protocol is used as a transport protocol for LPP in the user plane.

Position calculation can be conducted, for example, by a positioning server (e.g., Evolved Serving Mobile Location Center (E-SMLC) or SLP in LTE) or the UE. The latter corresponds to the UE-based positioning mode, while the former may be network-based positioning (calculation in a network node based on measurements collected from network nodes such as Location Measurement Units (LMUs) or eNodeBs) or UE-assisted positioning (calculation is performed in a positioning network node based on measurements received from the UE).

FIG. 1 illustrates the Uplink Time Difference of Arrival (UTDOA) architecture being currently discussed in 3GPP. Although uplink (UL) measurements may in principle be performed by any radio network node (e.g., eNodeB), UL positioning architecture may include specific UL measurement units (e.g., LMUs) which, e.g., may be logical and/or physical nodes, may be integrated with radio base stations or sharing some of the software or hardware equipment with radio base stations, or may be completely standalone nodes with their own equipment (including antennas). The architecture is not yet finalized, but there may be communication protocols between the LMU and the positioning node, and there may be some enhancements for LPPa or similar protocols to support UL positioning. A new interface, SLm, between the E-SMLC and LMU, is being standardized for uplink positioning. The interface is terminated between a positioning server (E-SMLC) and the LMU. It is used to transport LMUp protocol (a new protocol being specified for UL positioning, for which no details are yet available) messages over the E-SMLC-to-LMU interface. Several LMU deployment options are possible. For example, a LMU may be a standalone physical node, it may be integrated into an eNodeB, or it may be sharing at least some equipment, such as antennas, with an eNodeB—these three options are illustrated in FIG. 1.

LPPa is a protocol between an eNodeB and a LCS Server specified only for control-plane positioning procedures, although it still can assist user-plane positioning by querying eNodeBs for information and eNodeB measurements. In LTE, UTDOA measurements, UL RTOA, are performed on Sounding Reference Signals (SRS). To detect a SRS signal, a LMU needs a number of SRS parameters to generate the SRS sequence which is to be correlated to receive the signals. SRS parameters would have to be provided in the assistance data transmitted by the positioning node to the LMU, and this assistance data would be provided via LMUp. However, these parameters are generally not known to the positioning node, which needs them for obtaining information from the eNodeB that is configuring the SRS to be transmitted by the UE and to be measured by the LMU. This information would have to be provided in LPPa or a similar protocol.

The contents and composition of the assistance data/parameters to be provided to the LMUs by a positioning node is currently being discussed in 3GPP. A list of parameters, such as the examples shown in Table 1 below, may be signaled from the eNodeB to the positioning node and from the positioning node to the LMU. Further information on these example parameters can be found in the 3GPP submission: R2-121030, CR 36.305, Network Based Positioning Support, RAN WG2, February 2012.

TABLE 1

First example list of parameters to support UTDOA:

| Parameter Category | Parameters |
| --- | --- |
| General | C-RNTI |
| | Serving eNB eCGI, PCI |
| | UL-EARFCN |
| | Cyclic prefix Config |
| | UL-Bandwidth |
| SRS | Bandwidth |
| | Sub-frame configuration |
| | Frequency domain position |
| | Cyclic shift |
| | Duration |
| | Transmission comb |
| | Configuration index |
| | MaxUpPts |

Table 2 illustrates another, more detailed, example list of parameters that may alternatively be used. In general, any suitable list of parameters appropriate for the relevant network may be used.

TABLE 2

Second example list of parameters to support UTDOA:

| Parameter Category | Parameters |
| --- | --- |
| General | C-RNTI |
| | PCI of PCell[Note1] |
| | UL-EARFCN of PCell |
| SRS | For each serving cell in which SRS is configured [Note2]: |
| | PCI |
| | UL-EARFCN |
| | Duplex mode configuration |
| | Cyclic prefix Config |
| | Reference ID or code for UE-specific SRS [Note3] |
| | Number of ports for SRS transmission |
| | UL system bandwidth of the cell |

TABLE 2-continued

Second example list of parameters to support UTDOA:

| Parameter Category | Parameters |
| --- | --- |
| | Cell-specific SRS bandwidth configuration |
| | UE-specific SRS bandwidth configuration |
| | SRS subframe configuration |
| | Frequency domain position |
| | SRS frequency hopping bandwidth configuration |
| | Cyclic shift |
| | Transmission comb |
| | SRS configuration index |
| | MaxUpPts |

[Note 1] Including PCell should not imply configuring SRS on PCell
[Note 2] Multiple serving cells are possible for a UE configured with CA
[Note 3] If agreed by RAN1 to be used in Rel-11

A positioning result is a result of the processing of the obtained measurements, including Cell IDs, power levels, received signal strengths, etc., which may be exchanged among nodes in one of the pre-defined formats. The signaled positioning result is represented in a pre-defined format corresponding to one of the seven Universal Geographic Area Description (GAD) shapes. Positioning result may be signaled between, e.g.:

LCS target (e.g., UE device) and LCS server, e.g., over LPP protocol;
Positioning servers (e.g., E-SMLC and SLP), over standardized or proprietary interfaces;
Positioning server and other network nodes (e.g., E-SMLC and MME/MSC/GMLC/O&M/SON/MDT);
Positioning node and LCS Client (e.g., between E-SMLC and PSAP or between SLP and External LCS Client or between E-SMLC and UE).

In emergency positioning, the LCS Client may reside in Public Safety Answering Points (PSAPs). Positioning results are often based on radio measurements (e.g., timing measurements, such as timing advance and RTT, or power-based measurements, such as received signal strength) received from measuring radio nodes (e.g., UE or eNodeB or LMU).

As the name suggests, measurements for UL positioning and UTDOA are performed on UL transmissions, which may comprise, e.g., reference signal transmissions or data channel transmissions. Uplink Relative Time of Arrival (UL RTOA) is the currently standardized UTDOA timing measurement. This measurement may be performed on Sounding Reference Signals (SRS), which may be configured for periodic transmission. SRS transmissions may be triggered by any of the two trigger types:

Trigger type 0: higher layer signaling;
Trigger type 1: DCI formats 0/4/1A for FDD and TDD and DCI formats 2B/2C for TDD.

UL positioning measurement performance may significantly degrade if the measuring node, in at least some pre-scheduled measuring occasions, tries to perform measurements on a signal which has not been transmitted (e.g., the signal may be pre-scheduled but not transmitted for some reason, and the measuring node may not be aware of this). Ideally, for the best measurement performance (e.g., accuracy), a measuring node should be aware of all pre-scheduled measurement occasions where the signal to be measured is actually present. However, this would imply providing to the measuring node detailed scheduling information, which may be rather dynamic and may cause high signaling overhead, particularly when the scheduling information is generally not available at the measured node (e.g., when the measuring node is not the scheduling node; for example, the LMU may be not integrated into the eNodeB and may be a separate node).

As an alternative, the transmissions to be measured may be configured persistently or semi-persistently, i.e., with a less dynamic configuration, which may be, e.g., periodic scheduling. This minimizes the signaling overhead of communicating the scheduling-related information, but typically leads to less efficient resource utilization. Another alternative for reducing signaling overhead is to perform blind signal detection while performing a measurement, which, however, is more complex and resource-demanding for the measuring node and typically degrades measurement quality (e.g., may take a longer time to measure or degrades measurement accuracy).

SUMMARY

Particular embodiments of the present invention are directed to methods and apparatus for enhancing network positioning measurement performance by managing uncertain measurement occasions.

According to certain embodiments, a method is provided in a measuring node for enhancing uplink measurement performance, wherein the uplink measurement is a measurement performed on radio signals configured for a wireless device by a first network node in a communication network, and wherein the first network node is different from the measuring node. The method includes obtaining information about a plurality of measurement occasions in which the wireless device is scheduled to transmit one or more configured radio signals. An occasion comprises one or more time and/or frequency resources. The method also includes obtaining information about uncertain measurement occasions, wherein an uncertain measurement occasion comprises one of the plurality of measurement occasions in which the wireless device may or may not transmit the one or more configured radio signals. The method further includes selectively performing a radio signal measurement based on the obtained information and the radio signals received from the wireless device; and using the radio signal measurement for determining positioning of the wireless device.

In accordance with certain embodiments, the uncertain measurement occasions include one or more of an occasion when the wireless device is configured with a measurement gap and therefore does not transmit a configured uplink radio signal; an occasion when the wireless device may use an autonomous gap and therefore does not transmit a configured uplink radio signal; an occasion when the wireless device is in a low-activity state and therefore does not transmit a configured uplink radio signal; an occasion when the wireless device transmits over an uplink data channel or an uplink control channel and therefore does not transmit a configured uplink radio signal; and an occasion when the wireless device mutes a configured uplink radio signal to reduce its interference.

According to particular embodiments, the obtained information about the uncertain measurement occasions includes one or more of information indicating whether any measurement gaps are configured, reconfigured, used, or no longer used for the wireless device; information indicating whether measurement gaps are configured for any wireless device served by the first network node; information indicating that on-going measurements may require measurement gaps; information of a pre-determined measurement gap pattern configured for the wireless device; information of a pattern or configuration indicating occasions which are to be used for measurements because the indicated measurement occasions do not include measurement occasions that may be disturbed due to measurement gaps configured for the wireless device; information of a pattern or configuration indicating occasions which are to be avoided for measurements because the indicated measurement occasions comprise measurement occasions that may be disturbed due to measurement gaps configured for the wireless device; information indicating whether any scheduled measurement gaps may affect the uplink transmissions from the wireless device; and information about the wireless device's capability to perform inter-frequency or inter-Radio Access Technology (inter-RAT) measurements without measurement gaps.

Particular embodiments further provide a measuring node operable in a communication network and configured for enhancing uplink measurement performance, wherein the uplink measurement performance is the measurement performed on radio signals configured for a wireless device, the measuring node communicating with one or more wireless devices, and wherein the one or more wireless devices are in communication with a first network node, and wherein the first network node is different from the measuring node. The measuring node includes a processor; a memory coupled to the processor; a transceiver coupled to the processor; and an antenna coupled to the transceiver configured to transmit and receive messages. The processor is configured to obtain information about uncertain measurement occasions, wherein an uncertain measurement occasion comprises an occasion where the wireless device may or may not transmit one or more configured radio signals, and wherein an occasion comprises one or more time/frequency resources. The processor is further configured to selectively perform a radio signal measurement based on the obtained information and the radio signals received from the wireless device; and use the radio signal measurement for determining positioning of the wireless device.

In certain embodiments, the processor, configured to obtain information, is further configured to obtain information via cross-layer communication; obtain information via an internal or a proprietary interface; obtain information via signaling from a second network node; and obtain information autonomously.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
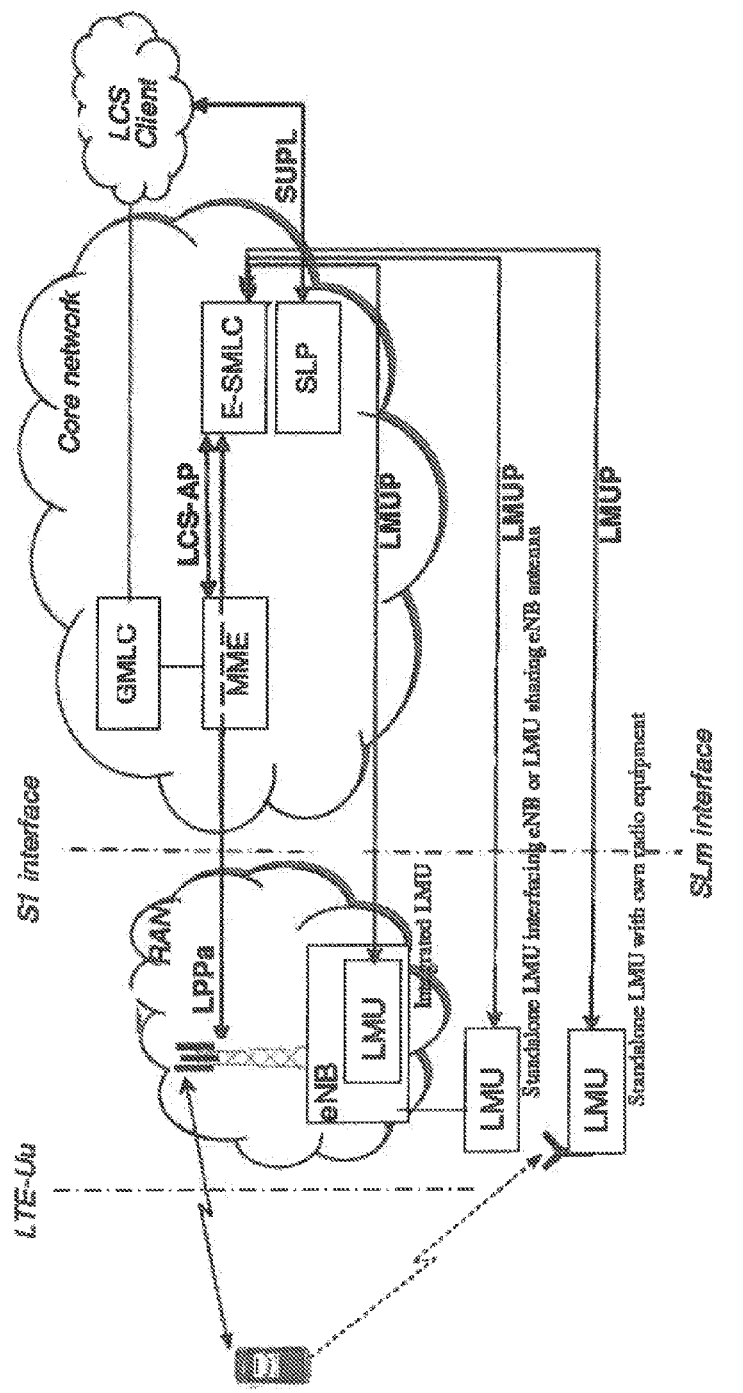
FIG. 1 illustrates the Uplink Time Difference of Arrival (UTDOA) architecture being discussed in the $3^{rd}$ Generation Partnership Project (3GPP).

Particular embodiments are directed to methods and apparatus for enhancing network positioning measurement performance by managing uncertain measurement occasions.

In the following description, numerous specific details are set forth. However, it is understood that embodiments of the invention may be practiced without these specific details. In other instances, well-known circuits, structures and techniques have not been shown in detail in order to not obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams are described with reference to the exemplary structural embodiments illustrated in the figures. However, it should be understood that the operations of the flow diagrams can be performed by structural embodiments of the invention other than those discussed with reference to figures, and the embodiments discussed with reference to figures can perform operations different than those discussed with reference to the flow diagrams.

Particular implementations of the solutions described herein may provide methods for controlling the number of disturbed UL transmissions or other types of uncertain UL measurement occasions. Particular implementations may alternatively or additionally provide methods for using information regarding such uncertain UL measurement occasions. Particular implementations may also enforce or utilize a maximum number of uncertain UL measurement occasions for which a particular measurement requirement holds. For example, a wireless device may implement mechanisms to ensure that such a maximum number is never exceeded or is not exceeded in certain situations, such as when certain measurements are configured, Similarly, a transmitting node may implement mechanisms that rely on an assumption that the maximum number is not exceeded and may adapt its measurement configuration based on this assumption. Likewise, a configuring node may configure the transmitting node so that the maximum number of uncertain measurement occasions is not exceeded and/or configure the measuring node so that the maximum number of uncertain measurement occasions at the measuring node is not exceeded.

Particular implementations of the solutions described herein may also enforce or utilize a minimum number of uncertain UL measurement occasions for which a particular measurement requirement holds. Knowledge of this minimum number of uncertain UL measurements information may be used, e.g., by the measuring node, as an indicator that a different measurement mechanism or different receiver techniques can or should be used (e.g., where the minimum number is high) since the uncertainty may be greater than normal. For example, the measuring node may choose to perform an additional step of determining or verifying (always or on some occasions) that the correct signal is being measured or that the signal to be measured was actually transmitted.

Additionally, particular implementations may provide techniques that allow a configuring node to acquire more information to reduce uncertain measurement occasions and/or configure a measuring node so that the number of uncertain UL measurement occasions is reduced.

Exemplary methods and apparatus in a communication network for enhancing network positioning measurement performance are directed to a communication network where uplink measurement is performed at a measuring node on radio signals configured for a UE device by a first network node, where the first network node is different from the measuring node. Although the described embodiments can be implemented in any appropriate type of telecommunication system supporting any suitable communication standards and using any suitable components, particular embodiments can be implemented in an LTE network, such as shown in FIG. 2.

Figure 2:
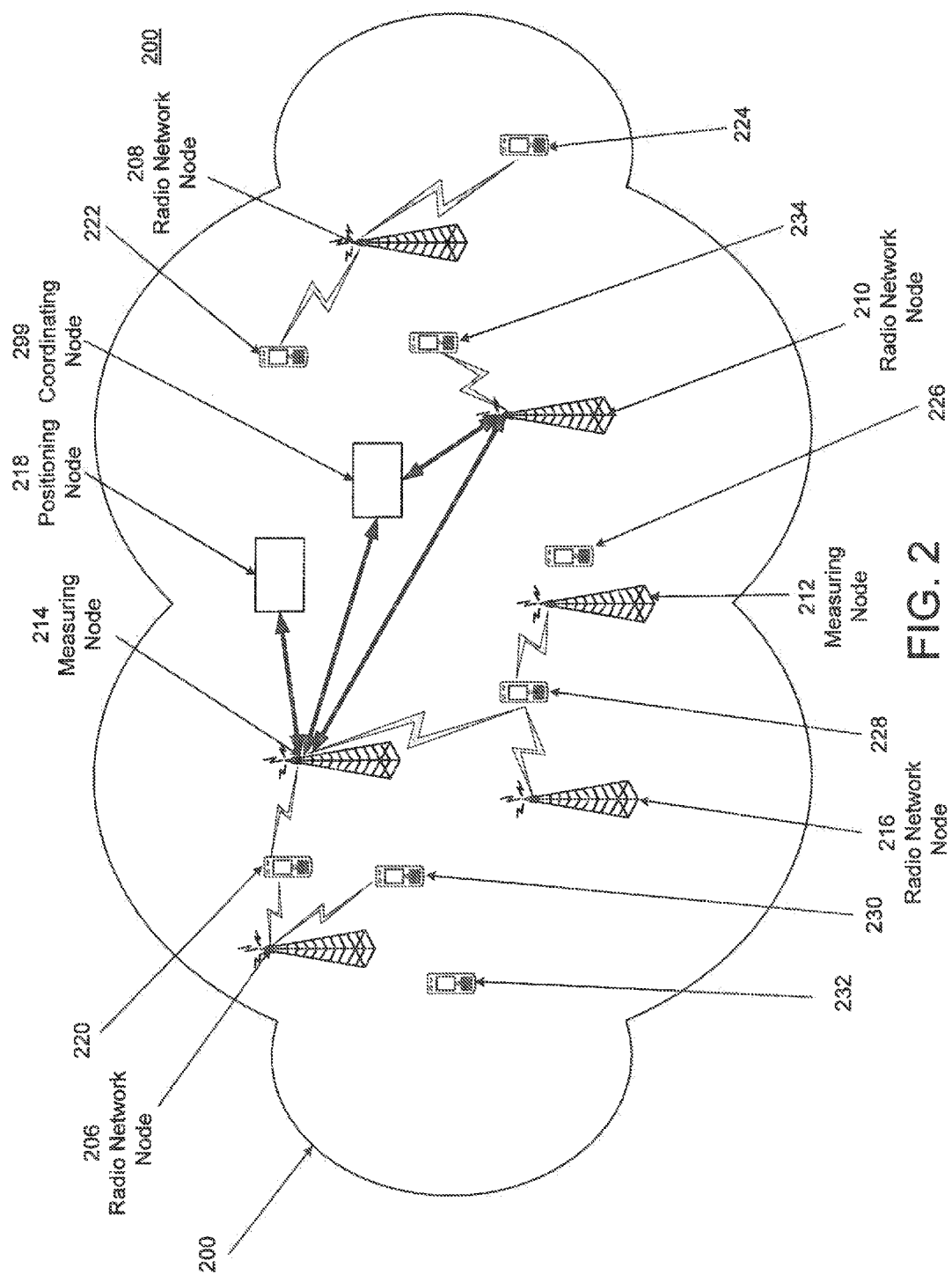
FIG. 2 illustrates an architecture of a homogeneous communication network for implementing a method for enhancing network positioning measurement performance by managing uncertain measurement occasions, in accordance with exemplary embodiments of the present invention.

Referring to FIG. 2, there is shown an architecture of a communication network 200 for implementing a method for enhancing uplink measurement performance. As shown, wireless communication network 200 includes radio network nodes 206, 208, 210, and 216. There is also shown measuring nodes 212 and 214 (which, in particular embodiments, may also represent radio network nodes such as eNodeBs). The example embodiment of communication network 200 also includes a positioning node 218 and a coordinating node 299.

Examples of radio network nodes 206-210 and 216 include base stations and relay nodes, such as, for example, serving eNodeB (eNB), high power, macro cell base stations, and relay nodes. While not expressly labeled in FIG. 2, the nodes can include positioning nodes and LMU's. Communicating with the nodes are wireless communication devices, such as UE devices 220-234.

Although the description below focuses, for the sake of illustration, on example embodiments in which the wireless communication devices represent User Equipment (UEs), the described solutions may be implemented with any suitable type of wireless communication devices including, but not limited to, full-function communication devices, wireless-capable computing devices (e.g., laptop and tablet computers, personal digital assistants (PDAs), and automated equipment capable of machine-type communication (MTC) and/or machine-to-machine (M2M) communication, such as wireless meters, sensors, digital billboards, wireless-capable appliances (e.g., a washing machine, oven, digital video recorder (DVR)), radio frequency identifier (RFID) tags, or any other devices capable of wireless communication.

Figure 3:
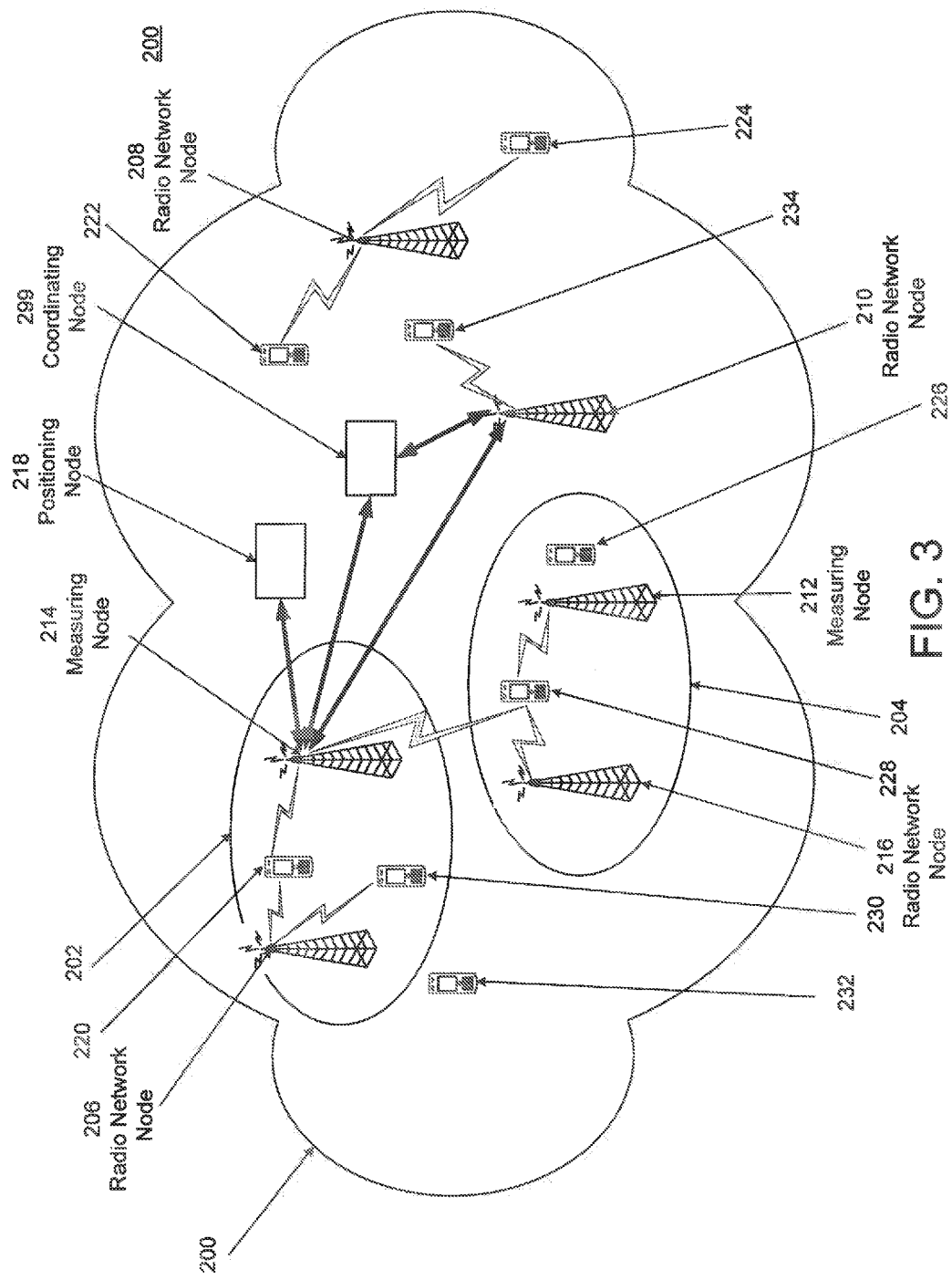
FIG. 3 illustrates a multi-layer architecture of heterogeneous and homogeneous communication networks for implementing a method for enhancing network positioning measurement performance by managing uncertain measurement occasions, in accordance with exemplary embodiments of the present invention.

Referring to FIG. 3, there is shown a multi-layer architecture of a communication network 200 for implementing a method for enhancing uplink measurement performance. FIG. 3 additionally shows network cells 202 and 204 of a heterogeneous network, wherein measuring node 212 can be viewed as a macro base station or high power node. Radio network node 206 can be viewed as low power, micro, pico, of femto nodes (hereinafter micro nodes) of the heterogeneous network 200. Exemplary embodiments function equally well in the homogeneous network of FIG. 2 and the heterogeneous network of FIG. 3.

Figure 4:
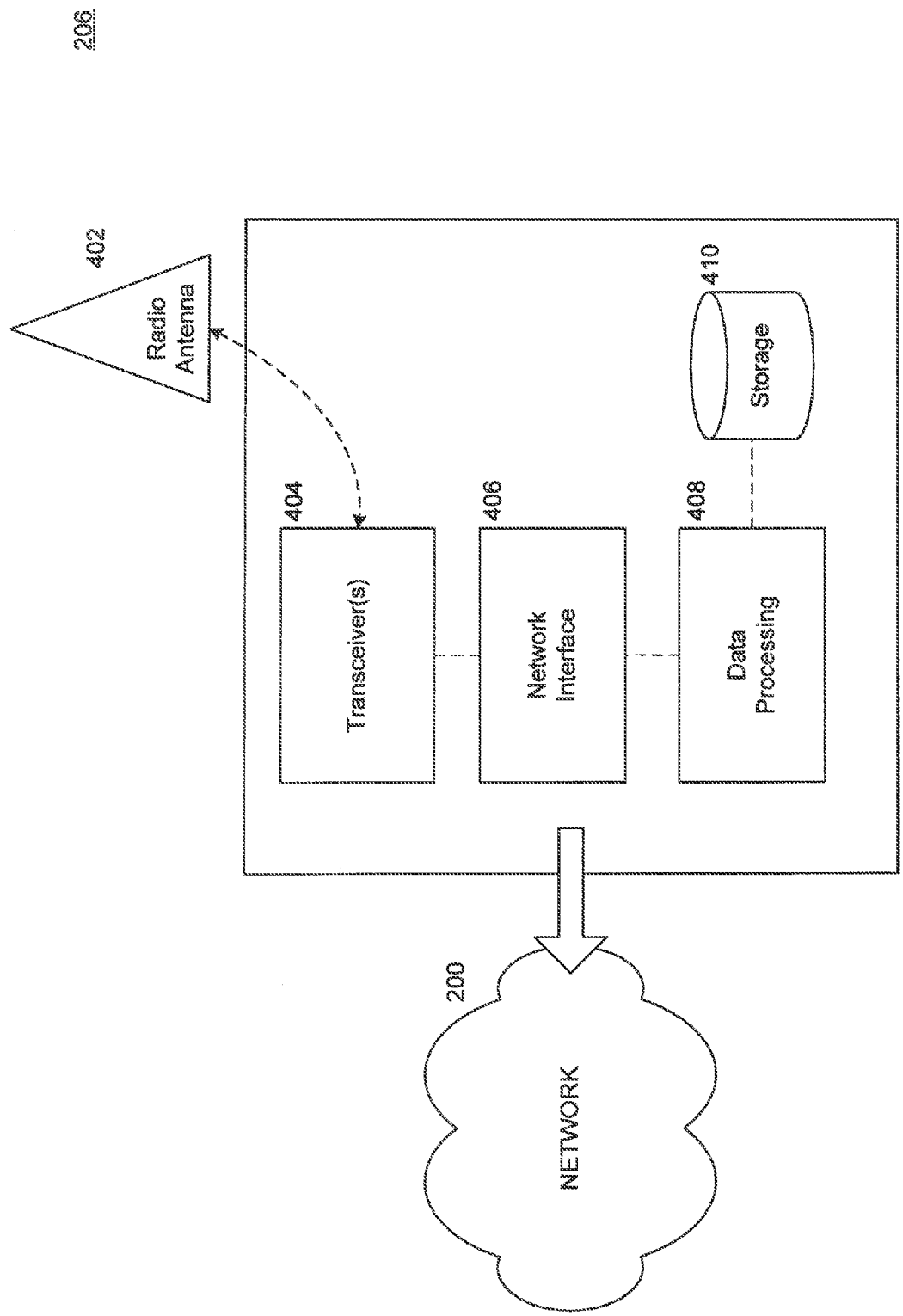
FIG. 4 is a block diagram of a radio network node, as used in the communication networks of FIGS. 2 and 3, in accordance with exemplary embodiments of the present invention.

Referring now to FIG. 4, a block diagram of nodes 206-218 and 299, as used in the communication network of FIG. 2 in accordance with exemplary embodiments, is illustrated. As shown in FIG. 4, nodes 206-218 and 299 may include: a data processing system 408, which may include one or more microprocessors and/or one or more circuits, such as an application specific integrated circuit (ASIC), Field-Programmable Gate Arrays (FPGAs), and the like; network interface 406; and a data storage system 410, which may include one or more non-volatile storage devices and/or one or more volatile storage devices (e.g., random access memory (RAM)). The network interface 406 is connected to a transceiver 404, which is configured to transmit and receive signals via a radio antenna 402. The radio antenna 402 can comprise one or more antennas, with the one or more antennas being directional antennas which direct signals to and receive signals from particular sectors of a geographic area, or network cell, covered by the node.

Although FIG. 4 illustrates the contents of an example embodiment of one of nodes 206-218 and 299, particular embodiments may omit certain of the shown elements, such as radio antenna 402. For example, particular embodiments of communication network 200 may include nodes, such as the example positioning node 218 and coordinating node 299 in FIGS. 2 and 3 that are not equipped for wireless communication. Such embodiments of nodes 206-218 and 299 may not include radio antenna 402 and may instead be equipped for wired communication via network interface 406 or other suitable elements of those embodiments.

In embodiments where the data processing system 408 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that, when executed by a processor, the code causes the data processing system 408 to perform steps described below (e.g., steps described below with reference to the flow charts shown in FIGS. 6, 7, and 8). In other embodiments, the nodes 206-218 and 299 are configured to perform steps described above without the need for code. That is, for example, the data processing system 408 may consist merely of one or more ASICs. Hence, the features of the present embodiments described above may be implemented in hardware and/or software. For example, in particular embodiments, the functional components of the nodes 206-218 and 299 described above may be implemented by the data processing system 408 executing computer instructions, by the data processing system 408 operating independent of any computer instructions, or by any suitable combination of hardware and/or software.

Figure 5:
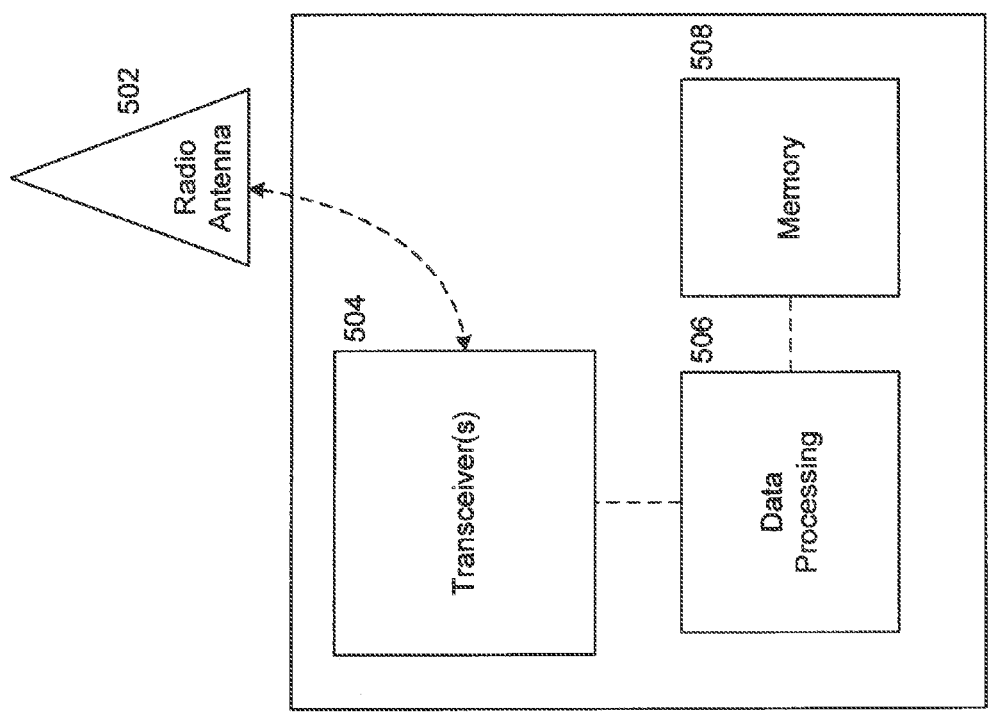
FIG. 5 is a block diagram of a User Equipment (UE) device, as used in the communication networks of FIGS. 2 and 3, in accordance with exemplary embodiments of the present invention.

Referring now to FIG. 5, a block diagram of a UE device, shown as exemplary device 220 used in the communication networks of FIG. 2 in accordance with exemplary embodiments, is illustrated. As shown in FIG. 5, the UE 220 may include: a data processing system 506, which may include one or more microprocessors and/or one or more circuits, such as an application specific integrated circuit (ASIC), Field-Programmable Gate Arrays (FPGAs), and the like; a transceiver 504 for transmitting data to (and receiving data from) nodes 206-216 via a radio antenna 502; and a memory 508, which may include one or more non-volatile storage devices and/or one or more volatile storage devices (e.g., random access memory (RAM)).

In embodiments where the data processing system 506 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the UE 220 to perform steps described below (e.g., steps described below with reference to the flow charts shown in FIGS. 6, 7, and 8). In other embodiments, UE 220 is configured to perform steps described above without the need for code. That is, for example, data processing system 506 may consist merely of one or more ASICs. Hence, the features of the present invention described above may be implemented in hardware and/or software. For example, in particular embodiments, the functional components of UE 220 described above may be implemented by the data processing system 506 executing computer instructions, by data processing system 506 operating independent of any computer instructions, or by any suitable combination of hardware and/or software.

As explained above, a UE is provided herein as one specific example of a wireless communication device that may be used in various embodiments of the communication network 200. In various embodiments, the wireless communication device may comprise any device equipped with a radio interface and capable of at least generating and transmitting a radio signal to a radio network node. Note that even some radio network nodes, e.g., micro BS 206, may also be equipped with a UE-like interface. The wireless communication devices described herein can each represent any suitable component capable of engaging in wireless communication, and can include devices that are not capable of supporting voice communication (e.g., sensors communicating only numeric data), as well as devices that do not serve solely as terminals within the wireless network (e.g., repeaters, relays, and micro BSs that are capable of connecting to the communication network 200 through its corresponding radio access network).

A radio network node 206 is characterized by its ability to transmit and/or receive radio signals, and it comprises at least a transmitting or receiving antenna. A radio network node may be an UE or a radio network node. Some examples of radio nodes are a radio base station (e.g., eNodeB in LTE or NodeB in UTRAN), a relay, a mobile relay, remote radio unit (RRU), remote radio head (RRH), a sensor, a beacon device, a measurement unit (e.g., LMUs), user terminal, PDA, mobile phone, laptop, etc.

A "radio network node" 206 may represent a radio node situated in a radio communications network 200 and possibly characterized by its own or an associated network address. For example, a mobile equipment device in a cellular network may have no network address, but a wireless device involved in an ad hoc network is likely to have a network address. A radio network node 206 may be capable of operating or receiving radio signals or transmitting radio signals in one or more frequencies, and may operate in single-radio access technology (RAT), multi-RAT or multi-standard mode (e.g., an example dual-mode user equipment may operate with any one or combination of WiFi and LTE or HSPA and LTE/LTE-A). A radio network node 206, such as a base station (e.g., an eNodeB), an RRH, an RRU, or transmitting-only/receiving-only nodes, may or may not create its own cell 202. It may also share a cell with another radio node which creates its own cell. More than one cell may be associated with a particular radio node. Further, one or more serving cells (in downlink (DL) and/or uplink (UL)) may be configured for a UE 220, e.g., in a carrier aggregation system where a UE 220 may have one Primary Cell (PCell) and one or more Secondary Cells (SCells).

A "network node" may be any radio network node or core network node. Some non-limiting examples of a network node are an eNodeB, RNC, positioning node, MME, PSAP, SON node, MDT node, coordinating node, and O&M node.

A "positioning node" described in various embodiments is a server or other type of node with positioning functionality. For example, for LTE, a positioning node may be understood to be a positioning platform in the user plane (e.g., Secure User Plane Location (SLP) in LTE) or a positioning node in the control plane (e.g., Evolved Serving Mobile Location Center (E-SMLC) in LTE). SLP may also comprise SLC and SPC, where SPC may also have a proprietary interface with E-SMLC. Positioning functionality may also be split among two or more nodes, e.g., there may be a gateway node between LMUs and E-SMLC, where the gateway node may be a radio base station or another network node. In this case, the term "positioning node" may relate to E-SMLC and the gateway node. In a testing environment, a positioning node may be simulated or emulated by test equipment. In general, as used herein, a "positioning node" may represent any suitable node in the access or core network of communication network 200, and may represent a node dedicated exclusively to positioning functionality or a node providing other functionality within the access or core network (such as an eNodeB, an RNC, an E-SMLC, etc.). In the example embodiments illustrated by FIGS. 2 and 3, this node is represented by a "positioning node 218" that represents a separate physical component from radio network nodes 206-210 and 216 and measuring nodes 212-214.

A "coordinating node" 299 is a network and/or node, which coordinates radio resources with one or more radio nodes 206. Some examples of a coordinating node 299 are network monitoring and configuration nodes, Operations Support System (OSS) nodes, Operations & Maintenance (O&M) nodes, Minimization of Drive Test (MDT) nodes, Self-Organizing Network (SON) nodes, positioning nodes, Mobility Management Entities (MME), gateway nodes such as Packet Data Network Gateway (P-GW) or Serving Gateway (S-GW) network nodes or femto gateway nodes), macro nodes coordinating smaller radio nodes associated with them, eNodeBs coordinating resources with other eNodeBs, etc. More generally, as used herein, a "coordinating node" may represent any suitable node in the access or core network of communication network 200, and may represent a node dedicated exclusively to coordination or management functionality or a node providing other functionality within the access or core network (such as an eNodeB, an RNC, an OSS node, etc.). For purposes of illustration, the embodiments of communication network 200 shown in FIGS. 2 and 3 include a separate coordinating node 299 that is assumed to represent or incorporate a management node responsible for managing certain aspects of the operation of radio network nodes 206-210 and/or measuring nodes 212-214, such as an O&M node.

The signaling described herein may occur via direct links or logical links (e.g. via higher layer protocols and/or via one or more network and/or radio nodes) and may involve direct signaling between the relevant elements or indirect signaling passing through one or more intermediate elements. For example, signaling from a coordinating node 299 may pass through another network node, e.g., a radio network node 206.

The exemplary embodiments are not limited to implementation in LTE networks, but may be implemented with any suitable Radio Access Network (RAN) or single- or multi-RAT. Some other RAT examples are LTE-Advanced, UMTS, HSPA, GSM, cdma2000, WiMAX, and WiFi. The embodiments described herein may be considered as independent embodiments or may be considered in any combination with each other to describe non-limiting examples of the exemplary embodiments. The embodiments are described, for purposes of illustration, with respect to UL positioning, e.g., positioning based on measurements performed on UL in general, but are not necessarily limited to such positioning or to positioning in general. One example of such a positioning method is UTDOA, but the embodiments disclosed herein may be used in conjunction with other UL positioning approaches. UL measurements may be timing measurements (e.g., UL RTOA, time of arrival in general, eNodeB Rx-Tx, RTT, UL propagation delay, time difference of arrival, an UL component of a two-directional measurement e.g. UL timing of the UE Rx-Tx measurement) or power-based measurements (e.g., received signal strength or received signal quality). A measuring node performing UL measurements may refer to any network node performing UL measurements, e.g., any of radio network nodes 206-210 or measuring nodes 212-214.

The exemplary embodiments are described, but not limited to, UL positioning of UE devices and Coordinated Multi-Point Transmission (COMP). At a high level, an uncertain measurement occasion is a time/frequency instance when an event occurs that raises uncertainty as to the accuracy or legitimacy of a measurement or the transmitted radio signal. In particular embodiments, such events may include any of the following exemplary occurrences:

A pre-scheduled measured signal/channel may or may not be transmitted, and the measuring node is not aware of when it is not transmitted. The risk is that the measuring node 212 may perform an erroneous measurement;

A measuring node 212 believes that the measured signal/channel is transmitted, but it is not. The risk is that the measuring node 212 may perform an erroneous measurement;

A measuring node 212 believes that the signal/channel is not transmitted, while the signal/channel is in fact transmitted and could be used for measurements. The risk is that the measurement occasions are lost, which may degrade overall measurement performance.

Uncertain measurement occasions may occur, e.g., due to the lack of dynamic scheduling information (e.g., when aperiodic SRS are used) and/or the lack of information about the transmitting node (e.g., the UE) behavior and/or capabilities (e.g., whether the UE 220 is using measurement gaps or whether the UE 220 can transmit SRS and other UL transmissions in the same subframe).

Below are several high-level examples (elaborated below) when pre-scheduled SRS may be not transmitted:

The UE 220 is allowed to not transmit SRS on different antenna ports simultaneously when it is configured with more than one serving cell;

When the UE 220 is using measurement gaps for performing inter-frequency or inter-RAT measurements, it may not transmit in UL;

When the UE 220 is using autonomous gaps for performing intra- or inter-frequency system information (SI) reading, it may not transmit in UL;

When the UE 220 is in a low-activity state (e.g., DRX or DTX);

A pre-scheduled signal/channel transmission may be muted at some time- and/or frequency-resource instances for the purpose of interference coordination;

A pre-scheduled signal/channel transmission may be reconfigured for various reasons, and the signal/channel may or may not be transmitted during the transition/reconfiguration period.

If a transmission may occur at any time for some reason, then in the worst case all pre-scheduled (e.g., periodic) measurement occasions may be uncertain measurement occasions. The ratio or the probability of an uncertain measurement occasion may be reduced, e.g. by:

- explicitly increasing awareness of the measuring node (e.g., by explicit signaling);
- optimizing transmission scheduling to reduce the probability of uncertain measurement occasions, e.g., avoiding situations when the transmission to be measurement may be deprioritized;
- smart measuring node implementation that is capable of, e.g., obtaining more accurate information about uncertain measurement occasions and make a measurement decision based on the obtained information.

Exemplary embodiments for reducing occurrence of uncertain measurement occasions are described herein, and the various embodiments can be applied singly or in any combination for providing enhanced network positioning network measurement performance. The methods may be implemented in one or more of radio network nodes 206-210 and 216 and/or positioning node 218 and/or measuring nodes 212-214 and/or coordinating node 299 (e.g., UE, radio network nodes such as eNodeBs and LMUs, and network nodes).

Figure 6:
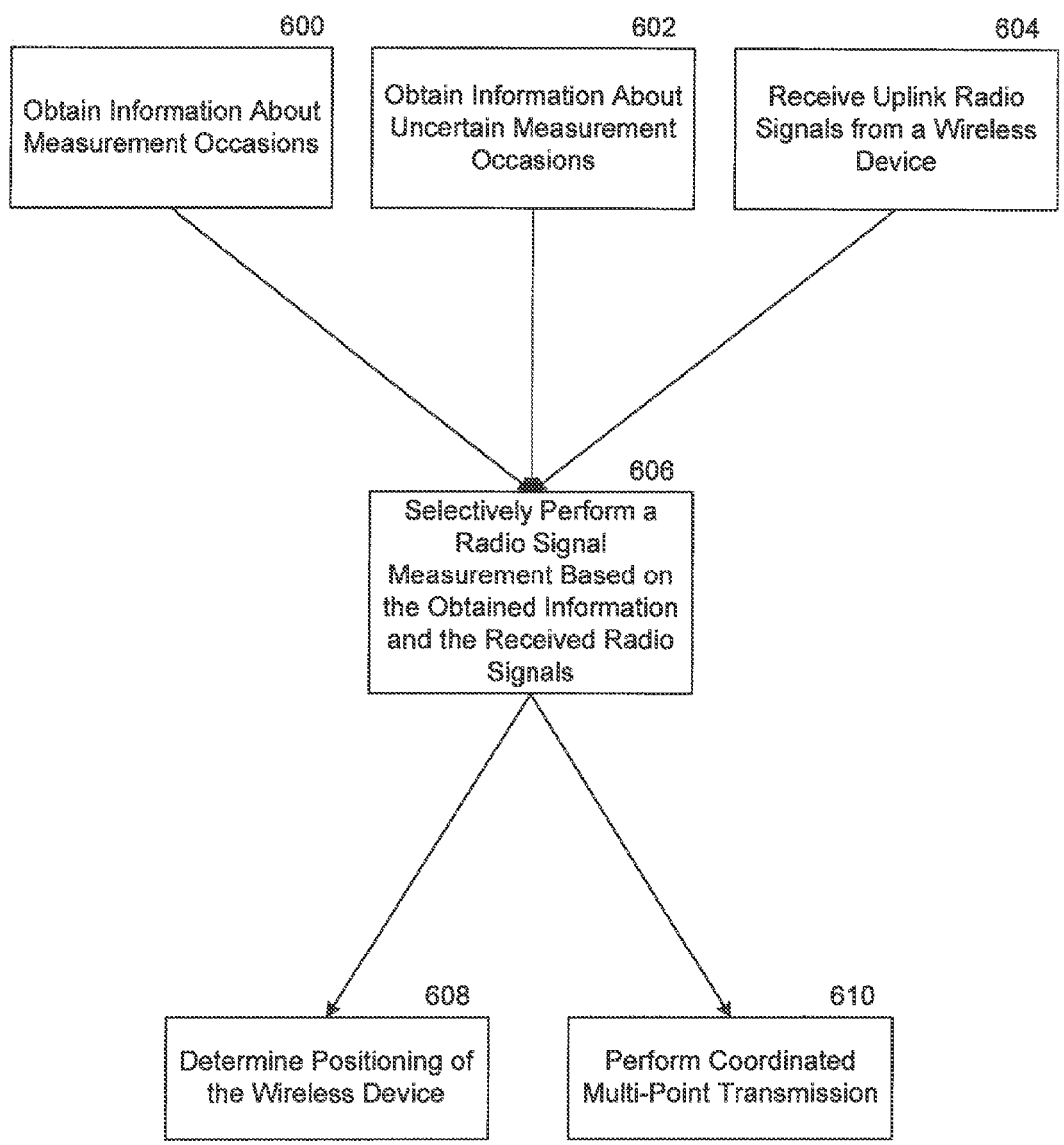
FIG. 6 is a flowchart illustrating the steps for enhancing uplink measurement performance by selectively performing radio signal measurement, in accordance with exemplary embodiments of the present invention.

Referring now to FIG. 6, there is shown a flowchart illustrating the steps for enhancing uplink measurement performance by selectively performing radio signal measurement in accordance with exemplary embodiments of the present invention. The method can take place in a measuring node 212 (e.g., a standalone LMU) for enhancing uplink measurement performance, wherein the uplink measurement is the measurement performed on radio signals configured for a UE device 220 by a configuring node (e.g., first network node 206) in a communication network 200, and wherein the configuring node is a different physical component from the measuring node 212. Alternatively, in particular embodiments, the measurement may be performed by a measuring node that represents the same physical component, or is integrated in the same physical component, as the configuring node (although possibly representing a separate logical component). For example, in particular embodiments, measuring node 212 may represent a radio network node that is responsible for both configuring the UL measurements in UE device 220 and performing the resulting measurements.

At step 600, information is obtained about a plurality of measurement occasions in which the wireless device is scheduled to transmit one or more configured radio signals. A measurement occasion comprises one or more time and/or frequency resources. At step 602, information is also obtained about uncertain measurement occasions, wherein an uncertain measurement occasion comprises one of the measurement occasions in which the UE device 220 may or may not transmit one or more configured radio signals. In particular embodiments, the uncertain measurement occasions may represent time/frequency resources in which the UE device 220 is scheduled to transmit the relevant uplink signals to be measured (e.g., based on a SRS transmission pattern configured for UE device 220), but in which the transmission may be, or is likely to be, superseded by another transmission or prevented by the occurrence of some other event. At step 604, uplink radio signals are received by the measuring node 212 from the UE device 220. The measuring node 212 selectively performs a radio signal measurement at step 606 based on the obtained information and the radio signals received from the UE device. The radio signal measurement is used at steps 608 and/or 610 for one or more of:

- determining positioning of the UE device 220 via a positioning node (e.g., the same network node responsible for performing the measurement or another node such as positioning node 218); and
- performing coordinated multi-point transmission (COMP).

Figure 7:
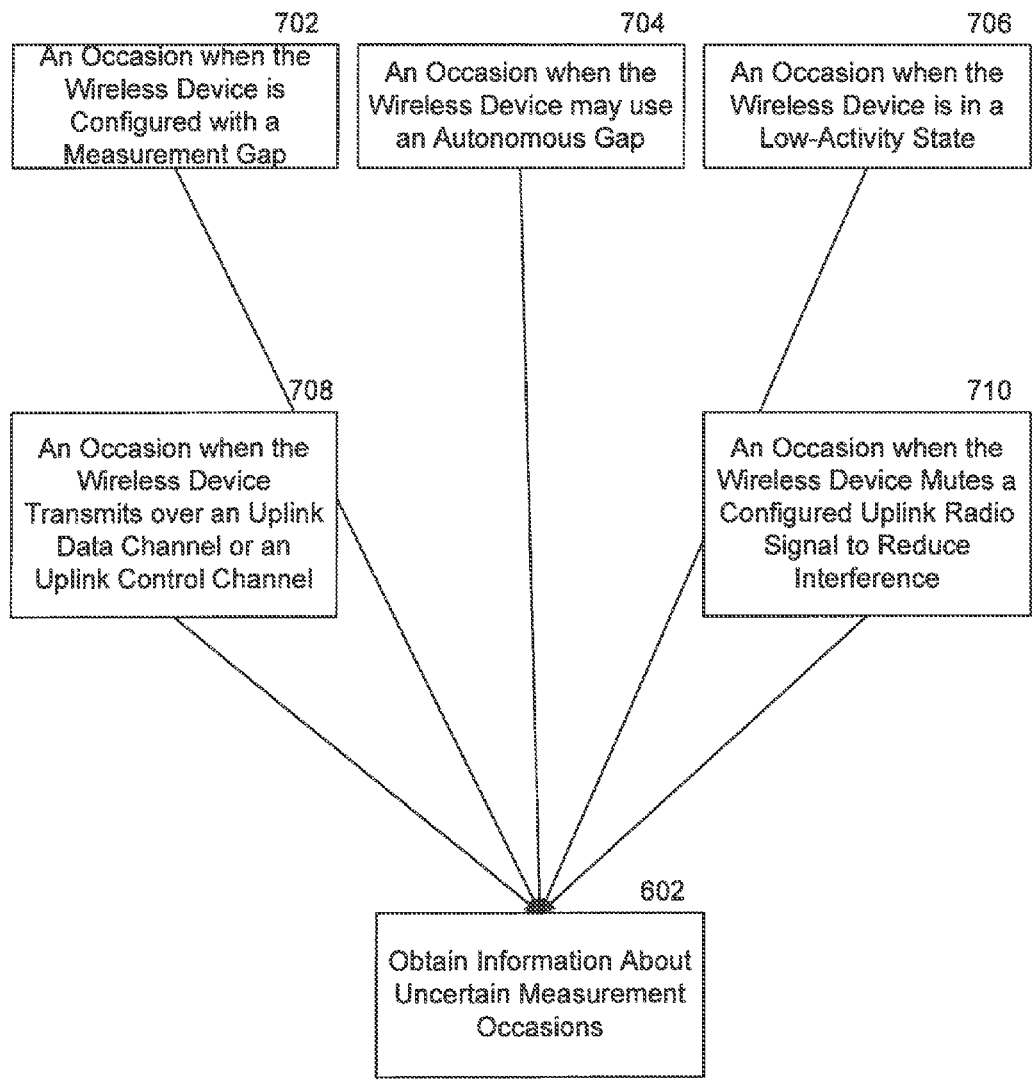
FIG. 7 is a chart illustrating uncertain measurement occasions, in accordance with exemplary embodiments of the present invention.

Referring now to FIG. 7, there is shown a chart illustrating uncertain measurement occasions in accordance with exemplary embodiments. The uncertain measurement occasions comprise one or more of an occasion 702 when the UE device is configured with a measurement gap; an occasion 704 when the UE device may use an autonomous gap; an occasion 706 when the UE device is in a low-activity state; an occasion 708 when the UE device transmits over an uplink data channel or an uplink control channel; and an occasion 710 when the UE device mutes a configured uplink transmission to reduce interference.

Figure 8:
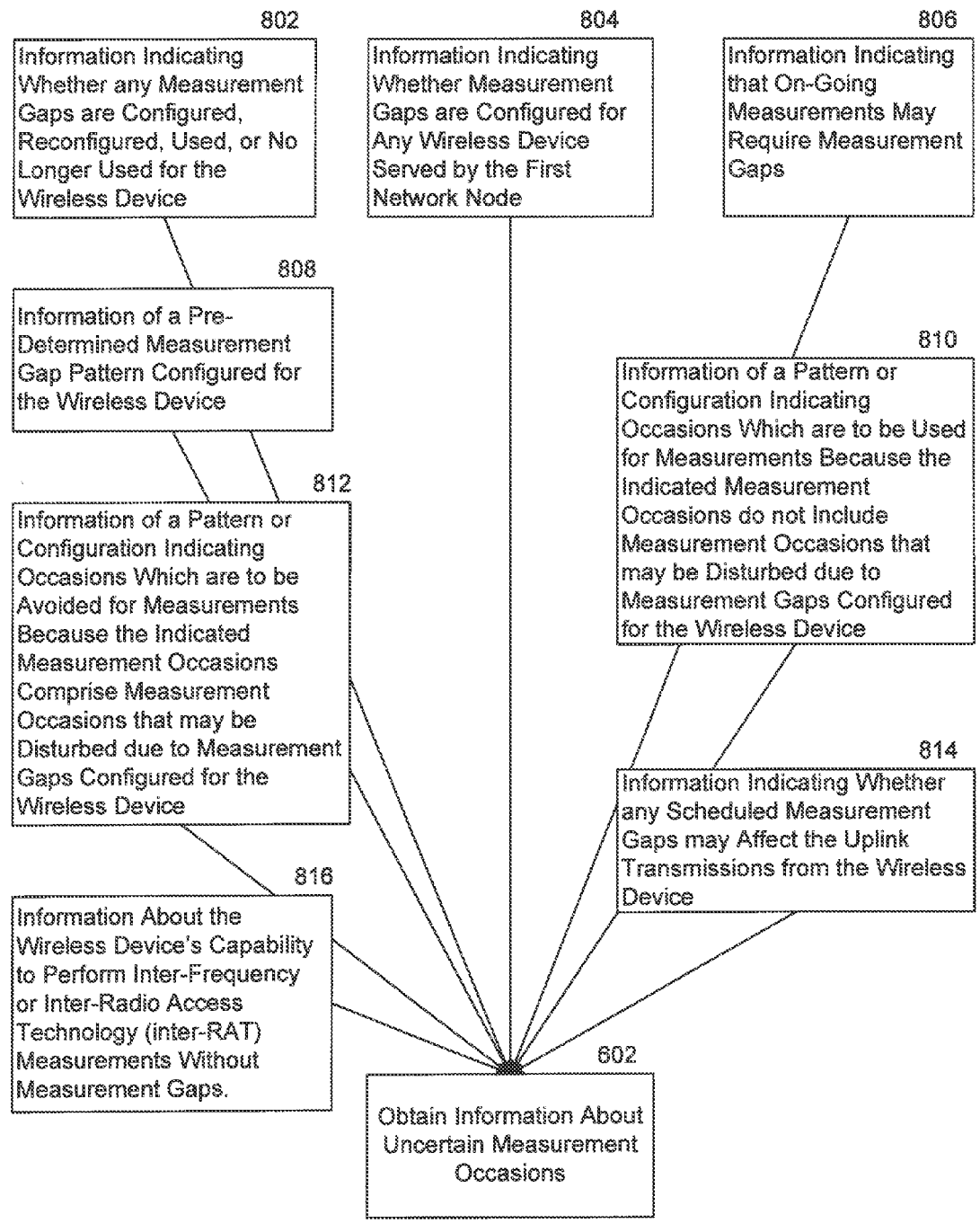
FIG. 8 is a chart illustrating obtained information about uncertain measurement occasions in accordance with exemplary embodiments of the present invention.

Referring now to FIG. 8, there is shown a chart illustrating obtained information about uncertain measurement occasions in accordance with exemplary embodiments. The obtained information about the uncertain measurement occasions comprises one or more of information 802 indicating whether any measurement gaps are configured, reconfigured, used, or no longer used for the UE device; information 804 indicating whether measurement gaps are configured for any UE device served by the first network node; information 806 indicating that on-going measurements may require measurement gaps; information 808 of a pre-determined measurement gap pattern configured for the UE device; information 810 of a pattern or configuration indicating occasions which are to be used for measurements because the indicated measurement occasions do not include measurement occasions that may be disturbed due to measurement gaps configured for the UE device; information 812 of a pattern or configuration indicating occasions which are to be avoided for measurements because the indicated measurement occasions comprise measurement occasions that may be disturbed due to measurement gaps configured for the UE device; information 814 indicating whether any scheduled measurement gaps may affect the uplink transmissions from the UE device; and information 816 about the UE device's capability to perform inter-frequency or inter-Radio Access Technology (inter-RAT) measurements without measurement gaps.

In one embodiment, there is a solution for handling uncertain UL measurement occasions due to measurement gaps, such as when the UE is not transmitting configured radio signals. A UE 220 may require measurement gaps, e.g., to identify and measure inter-frequency and/or inter-RAT cells. E-UTRAN (typically via serving cell) provides the UE 220 with a single measurement gap pattern with constant gap duration for concurrent monitoring of all frequency layers and RATs. When measurement gaps are used, the following restrictions may apply:

- During the measurement gaps, the UE 220 shall not transmit any data (including SRS), and it is not expected to tune its receiver on the E-UTRAN serving carrier frequency;
- For E-UTRAN FDD, the UE 220 shall not transmit in the subframe occurring immediately after the measurement gap;
- For E-UTRAN TDD, the UE 220 shall not transmit in the uplink subframe occurring immediately after the measurement gap if the subframe occurring immediately before the measurement gap is a downlink subframe;

Herein, the term "measurement occasions disturbed by measurement gaps" is used to denote time/frequency resources (e.g., subframes) during which measurement gaps are configured. In some embodiments, the term may also comprise an adjacent time/frequency resource, e.g., one or a pre-defined number of subframes immediately after the measurement gap or one or a pre-defined number of subframes immediately before the measurement gap. The following measurement gap patterns are currently supported by the 3GPP 36.133 standard:

| Gap Pattern Id | Measurement Gap Length (MGL, ms) | Measurement Gap Repetition Period (MGRP, ms) | Minimum available time for inter-frequency and inter-RAT measurements during 480 ms period (Tinter1, ms) | Measurement Purpose |
| --- | --- | --- | --- | --- |
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

In this embodiment, the measuring node 212 performing UL measurements obtains the information about using measurement gaps by the UE device 220 and uses this information for configuring/performing the UL measurements. By doing so, the measuring node's awareness about transmitted signals/channels is increased and thus occurrence of uncertain measurement occasions is reduced (i.e. "uncertain" becomes "known"). The measuring node 212, being aware (based on the obtained information) that measurement gaps may be used and/or when the measurement gaps are used, may choose e.g. to:
- not perform measurements on at least one pre-scheduled UL transmission which may be disturbed by measurement gaps; or
- give a lower weight/priority to measurements which may be potentially disturbed by measurement gaps (e.g., when the measuring node 212 is aware of using measuring gaps by the UE and may be aware of approximate time instances, e.g. radio frames, but not the exact subframes).

In one embodiment, the measuring node 212 and the network node configuring UL transmissions (e.g., radio network node 206) are different physical nodes (e.g., standalone LMU and eNodeB). In another embodiment, the measuring node 212 and the node configuring UL transmissions are different logical nodes (e.g., LMU integrated into eNodeB and the eNodeB).

The information about using measurement gaps by the UE device 220 may comprise, e.g.,
- An indication of whether any measurement gaps are configured/reconfigured/used/no longer used for the UE,
- An indication of whether measurement gaps are configured for any UE served by a given radio network node;
- An indication of on-going measurements that may require measurement gaps (e.g., inter-frequency DL positioning measurements);
- A configured measurement gap pattern (e.g., one of the pre-defined patterns, reference starting time of the pattern, etc.);
- A pattern or configuration which indicates to the measuring node (e.g., radio network node 206) measurement occasions which are to be used for measurements, wherein the indicated measurement occasions do not include measurement occasions that may be disturbed due to measurement gaps configured for a given UE 220;
- A pattern or configuration which indicates to the measuring node 212 measurement occasions which are to be avoided for measurements, wherein the indicated measurement occasions comprise at least measurement occasions that may be disturbed due to measurement gaps configured for a given UE 220;
- Information about whether any measurement gaps which are currently configured for the UE 220 that may disturb certain UL transmissions (e.g., pre-scheduled UL transmissions may be disturbed if measurement gaps conflict with the pre-scheduled UL transmissions);
- Information about measurement gap purpose or measurement occasions or signal/channel transmission scheduling for which measurement gaps may be used, e.g.
    - Positioning reference signal (PRS) may be periodically transmitted using a pre-defined periodicity (e.g., 160 ms, 320 ms, 640 ms, or 1280 ms), so if it is known that the UE 220 was requested to perform inter-frequency measurements on PRS, and it is known when PRS are transmitted on the other frequency, it is also possible to deduce approximately when measurement gaps may be configured;
    - If it is known that measurement gaps are used for System Information (SI) reading and if it is known when the SI is transmitted, it is possible to deduce approximately when measurement gaps may be configured;
- Explicit information about UE 220 capability for performing inter-frequency or inter-RAT measurements without measurement gaps;
- Implicit information about UE 220 capability for performing inter-frequency or inter-RAT measurements without measurement gaps (e.g., CA-capable UE 220 or a UE 220 of a certain pre-defined category may not require measurement gaps).

The information about measurement gaps used by the UE device 220 may be obtained in different ways, e.g., by one or any combination of the below. Additionally, subsequent embodiments disclosed herein can use one or more of these same methods for obtaining information regarding various uncertain measurement occasions.

By cross-layer communication and/or via an internal interface, e.g., an integrated LMU obtains the measurement gap information via cross-layer communication with the eNodeB's unit handling and/or storing the measurement gap related information or the information related to on-going inter-frequency/inter-RAT measurements or requests/indication for the need for measurement gaps (e.g., such as InterFreqRSTDMeasurementIndicatio which may be received via RRC from the UE 220 for supporting OTDOA inter-frequency measurements);

a LMU sharing at least some resources with eNodeB may be able to obtain this information via an internal or proprietary interface.

By explicit signaling, e.g., from a network node 206 (e.g., positioning node provides this information to LMU via LMUp);

the providing network node 206 may also obtain this information from another node (e.g., eNodeB serving the UE 220 or from the UE 220).

from a radio network node (e.g., from eNodeB to LMU or to another eNodeB which is associated with the LMU or from a serving eNodeB to a measuring eNodeB), from a node transparently via another node e.g., from eNodeB to an LMU via UE 220 or another eNodeB or a positioning node or a gateway node, or from a positioning node to a LMU via a gateway node.

Autonomously, e.g., by learning from measurement configuration information (e.g., if a LMU receives SRS configuration for the same UE 220 in multiple serving cells, it may assume that the UE 220 is configured with CA and thus would typically not use measurement gaps), or by learning from the transmitting node's capability (e.g., UE capability to perform inter-frequency measurements without measurement gaps).

Any combination of the above, e.g.,

Given a limited set of measurement gap patterns, by knowing that measurement gaps are used and knowing at least one occasion when the gap is used (e.g., received information via signaling), it is possible to autonomously deduce the next measurement occasions that may be disturbed by measurement gaps.

The information about measurement gaps used by the UE device 220 may be obtained by the measuring node 212 upon a request, pro-actively, periodically, upon an event which may occur at the node 206 sending the information or at the measuring node 212 (e.g., upon receiving an UL positioning information or measurement request, upon configuring/reconfiguring/deconfiguring measurement gaps) or upon a condition (e.g., on-going UL positioning session for a given UE 220).

If the information is received from another node, then that other node either has the information or can obtain the information (e.g., from a third node, e.g., a positioning node sending the information to a LMU may obtain the information from a eNodeB).

In another embodiment, the configuring node (e.g., the eNodeB configuring/scheduling SRS transmissions of a given UE 220) configures/schedules the UL transmissions (e.g., configures a reference time and periodicity of SRS configured for UL positioning or for CoMP) and/or configures measurement gaps such that the overlap between the configured UL transmissions and the measurement gaps is avoided. Such behavior of the configuring node may also be imposed by a pre-defined rule, e.g., by a condition in an UL measurement requirement. There may also be a pre-defined rule specifying that the UL measurement period may be longer, or the UL measurement accuracy may be worse (or alternatively, the same accuracy may be met at a higher signal quality) when measurement gaps are used by the UE 220 during the on-going UL measurement.

An exemplary embodiment can be directed to handling uncertain UL measurement occasions due to autonomous gaps. The UE 220 may read the system information (SI) for multiple purposes. The SI, divided into Master Information Block (MIB) and SI Blocks (SIBs), contains the most essential physical layer information of the cell necessary to receive further SI (MIB), the information for accessing the cell, and the information for scheduling of other SIBs (SIB1), etc. Reading at least MIB and SIB1 is necessary, such as for acquiring CGI, which uniquely identifies a cell and which may be requested by the serving cell. The UE 220 may be requested to report CGI for a specific purpose, e.g., verification of a CSG cell, which becomes particularly important in heterogeneous network deployments, establishment of SON, ANR, etc.

In LTE, the MIB includes a limited number of the most essential and the most frequently transmitted parameters that are needed to acquire other information from the cell, and is transmitted on BCH. In particular, the following information is currently included in the MIB:

DL bandwidth;
Physical Hybrid-ARQ Indicator Channel (PHICH) configuration; and
System frame number (SFN).

The MIB is transmitted periodically with a periodicity of 40 ms and repetitions made within 40 ms. The first transmission of the MIB is scheduled in subframe #0 of the radio frames for which the SFN mod 4=0, and the repetitions are scheduled in subframe #0 of all other radio frames. In LTE, the SIB1 contains, e.g., the following information:

Public LAN Mobile Network (PLMN) identity;
Cell identity;
CSG identity and indication;
Frequency band indicator;
SI-window length; and
Scheduling information for other SIBs.

The LTE SIB1 may also indicate whether a change has occurred in the SI messages. The LTE SIB1, as well as other SIB messages, is transmitted on Downlink Shard Channel (DL-SCH). The SIB1 is transmitted with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

In E-UTRAN, the serving cell can request the UE 220 to acquire the cell global identifier (CGI), which uniquely identifies a cell, of the target cell. To acquire the CGI of the target cell, the UE 220 has to read at least part of the SI, including the MIB and the relevant SIB (e.g., in case of inter-RAT UTRAN, the UE 220 reads the MIB and the SIB3 of the target UTRAN cell to acquire its CGI). The reading of the SI for the acquisition of CGI is carried out during autonomous measurement gaps which are autonomously created by the UE 220.

The UE 220 may make autonomous gaps in downlink reception and uplink transmission for receiving MIB and SIB1 messages. The corresponding requirements for both intra- and inter-frequency SI reading were introduced in Rel-9. Currently there is no requirement that the UE 220 has to be capable of transmitting in UL or performing measurements and reading SI in parallel, which implies that at least some UEs 220 may perform measurements and read SI in time-domain multiplexing (TDM) fashion.

In this embodiment, the measuring node 212 performing UL measurements obtains the information about using autonomous measurement gaps from the UE device 220 and uses this information for configuring/performing the UL measurements. Given the purpose of creating autonomous gaps (e.g., CGI reading), it may also be possible to deduce when the autonomous gaps are configured.

In one embodiment, obtaining the information about using autonomous measurements comprises obtaining the information when the signals/channels to be measured in autonomous gaps are transmitted. This signal/channel transmission information may be obtained by cross-layer communication, explicit signaling, and/or autonomously, as disclosed above, and/or by any of the following methods:

obtained from another node (e.g., the information being a pattern or a reference time point, e.g. a time offset with respect to the serving cell, when the periodicity is pre-determined; the information may be obtained from a network node such as a positioning node or from an eNodeB);

detected or searched by the measuring node 212 (e.g., a LMU searches for a pre-defined signal, determines a cell timing and deduces SI transmission occasions for that cell; or a LMU tries to read the SI of at least one neighbor cell and in case of a successful reading, knows the SI occasions of that cell);

autonomously, based on the available information, e.g., if the measuring node 212 knows the time offsets of neighbor cells (e.g. for a synchronous network, ideally zero offset or offset within a synchronization requirement; FDD networks may or may not be synchronous, while TDD networks are typically synchronous), the occurrence of at least MIB and SIB1 may be calculated.

MIB and SIB1 are transmitted at pre-defined resources, as described above. To determine the transmit occasions of MIB and SIB1, it would be sufficient to know the transmission timing of the corresponding cell (absolute or relative timing, e.g., with respect to a serving or a reference cell). Any of the embodiments described for measurement gaps may also be apply for autonomous gaps. Autonomous gaps may also be created when measurement gaps are being used (e.g., measurement gaps are being used for other purpose).

In one embodiment, the measuring node 212 may be configured to assume that at least one of the MIB and SIB1 transmissions may be read by the UE 220 in autonomous gaps; and thus, the corresponding time/frequency resources may be not used for performing UL measurements, or the UL measurement samples in these time/frequency resources may be assigned a lower weight/priority.

In another embodiment, the configuring node (e.g., the eNodeB configuring/scheduling SRS transmissions of a given UE 220) configures/schedules the UL transmissions (e.g., SRS configured for UL positioning or for CoMP) such that the overlap between the configured UL transmissions and the time/frequency resources used for scheduling SI in the serving and/or at least one neighbor cell is avoided. Such behavior of the configuring node may also be imposed by a pre-defined rule, e.g., by a condition in an UL measurement requirement.

There may also be a pre-defined rule specifying that the UL measurement period may be longer, or that the UL measurement accuracy may be worse (or alternatively, the same accuracy may be met at a higher signal quality) when autonomous gaps are used by the UE 220 during the on-going UL measurement.

An exemplary embodiment can be directed to handling uncertain UL measurement occasions due PUSCH or PUCCH transmissions. Examples when, according to the current 3GPP standard, SRS transmissions may be dropped due to PUSCH transmissions include:

A UE 220 shall not transmit SRS whenever SRS and PUSCH transmissions happen to coincide in the same symbol;

A UE 220 shall not transmit SRS whenever SRS and a PUSCH transmission corresponding to a Random Access Response Grant or a retransmission of the same transport block as part of the contention based random access procedure coincide in the same subframe.

Some examples when, according to the current 3GPP standard, SRS transmissions may be dropped due to PUCCH transmissions:

A UE 220 shall not transmit type 0 triggered SRS whenever type 0 triggered SRS and PUCCH format 2/2a/2b transmissions happen to coincide in the same subframe. A UE 220 shall not transmit type 1 triggered SRS whenever type 1 triggered SRS and PUCCH format 2a/2b or format 2 with HARQ-ACK transmissions happen to coincide in the same subframe. (A UE 220 shall not transmit PUCCH format 2 without HARQ-ACK whenever type 1 triggered SRS and PUCCH format 2 without HARQ-ACK transmissions happen to coincide in the same subframe.);

A UE 220 shall not transmit SRS whenever a SRS transmission and a PUCCH transmission carrying HARQ-ACK and/or positive SR happen to coincide in the same subframe if the parameter ackNackSRS-SimultaneousTransmission is FALSE. (A UE 220 shall transmit SRS whenever SRS transmission and PUCCH transmission carrying HARQ-ACK and/or positive SR using shortened format happen to coincide in the same subframe if the parameter ackNackSRS-SimultaneousTransmission is TRUE.);

The parameter ackNackSRS-SimultaneousTransmission provided by higher layers determines if a UE 220 is configured to support the transmission of HARQ-ACK on PUCCH and SRS in one subframe. If the UE 220 is configured to support the transmission of HARQ-ACK on PUCCH and SRS in one subframe, then, in the cell specific SRS subframes of the primary cell, the UE 220 will transmit HARQ-ACK and SR using the shortened PUCCH format, where the HARQ-ACK or the SR symbol corresponding to the SRS location is punctured.

It has been proposed in 3GPP to signal the ackNackSRS-SimultaneousTransmission parameter to the measuring node 212. It must be noted, however, that when this parameter is FALSE, the measuring node 212 still is not aware when and what PUCCH transmissions occur. Further, this parameter does not help UE-specific SRS and not SRS on SCells.

A UE shall not transmit SRS whenever SRS transmission on any serving cells and PUCCH transmission carrying HARQ-ACK and/or positive SR using normal PUCCH happen to coincide in the same subframe.

In another embodiment, the measuring node 212 performing UL measurements obtains information about PUCCH transmission occasions and/or PUSCH transmission occasions (any UL transmissions in general which may disturb the UL measurements), due to which SRS transmissions may be dropped. The measuring node 212 uses this information for configuring/performing the UL measurements.

In one embodiment, the measuring node 212, based on the obtained information, may decide to not perform the UL measurements in the corresponding time/frequency resources, or it may decide to assign lower weights/priority to the UL measurement samples in these time/frequency resources.

The information about UL transmissions which may disturb the UL measurements may comprise, e.g.,

- An indication of whether there are on-going DL transmissions for which HARQ process is used for the given UE 220;
- An indication of whether there are on-going UL transmissions for the given UE 220,
- A configured DL transmission pattern if any (e.g., data scheduled in persistent or semi-persistent way such as VoIP; or DL transmit patterns such as used for Inter-Cell enhanced Interference Coordination (eICIC) when victim UEs 220 are scheduled in low-interference subframes and aggressor-cell UEs 220 are not scheduled in low-interference subframes such as ABS);
  - When HARQ feedback occurs at pre-defined occasions (typically in subframe n+4, where n is the subframe in which the DL transmission occurs), it may be possible to predict when PUCCH transmissions with HARQ feedback may occur or when they may not occur, based on a DL transmission pattern;
- A configured UL transmission pattern if any (e.g., UL low-interference subframes configured for victim-UE transmissions or UL ABS subframes configured for aggressor-UE transmissions);
- A pattern or configuration which indicates to the measuring node 212 measurement occasions which are to be used for measurements, wherein the indicated measurement occasions do not include measurement occasions that may be disturbed due to other UL transmissions for a given UE 220,
- A pattern or configuration which indicates to the measuring node measurement occasions which are to be avoided for measurements, wherein the indicated measurement occasions comprise at least measurement occasions that may be disturbed due to other UL transmissions for a given UE;
- Explicit information about UE capability of transmitting UL data and SRS in the same subframe and/or symbol.

Similarly to the above embodiments, obtaining information about uncertain measurement occasions may be accomplished in one or more different ways, e.g., by any one or combination of cross-layer communication, via internal or proprietary interface; by explicit signaling; and/or autonomously.

In another embodiment, the configuring node (e.g., a eNodeB configuring/scheduling SRS transmissions of a given UE 220) configures/schedules the UL transmissions (e.g., SRS configured for UL positioning or for CoMP) and/or other UL or DL transmissions such that the overlap between the configured UL transmissions and the time/frequency resources used for other UL transmissions (e.g., PUSCH or HARQ feedback transmitted in UL) is avoided. Such behavior of the configuring node may also be imposed by a pre-defined rule, e.g., by a condition in an UL measurement requirement.

There may also be a pre-defined rule specifying that the UL measurement period may be longer, or the UL measurement accuracy may be worse (or alternatively, the same accuracy may be met at a higher signal quality) when the on-going UL measurement is disturbed by other UL measurements. There may also be a pre-defined rule which specifies a maximum number of disturbed UL transmissions or a maximum number of uncertain UL measurement occasions for which a measurement requirement holds.

An exemplary embodiment can be directed to handling uncertain UL measurement occasions due to interference coordination. Some of the pre-scheduled UL transmissions may be dropped (or muted) for the purpose of interference coordination. In this embodiment, the measuring node 212 performing UL measurements obtains information about muted UL transmissions and uses this information for configuring/performing the UL measurements. Based on the obtained information about muted UL transmissions, the measuring node 212 may decide to not perform the UL measurements in the corresponding time/frequency resources or assign lower weights/priority to the UL measurement samples in these time/frequency resources (depending on how detailed the muting information is).

The information about UL transmission muting may comprise, e.g.,

- An indication of whether muting is used;
- An indication of whether muting can be used, which may be
  - Explicit;
  - Implicit, e.g. comprised in a general UE 220 capability or a specific UE 220 capability, such as related to CoMP or positioning;
  - Indirect, e.g., a transmit power level may also be an indication of whether muting can be used (e.g., transmissions at a transmit power above a pre-defined threshold may be muted);
- A configured muting pattern;
- A pattern or configuration which indicates to the measuring node measurement occasions which are to be used for measurements, wherein the indicated measurement occasions do not include measurement occasions where the UL transmissions are muted or may be muted for a given UE 220,
- A pattern or configuration which indicates to the measuring node measurement occasions which are to be avoided for measurements, wherein the indicated measurement occasions comprise at least measurement occasions where the UL transmissions are mute or may be muted for a given UE.

Similarly to the above embodiments, obtaining information about uncertain measurement occasions may be accomplished in one or more different ways, e.g., by any one or combination of cross-layer communication, via internal or proprietary interface; by explicit signaling; and/or autonomously.

There may also be a pre-defined rule specifying that the UL measurement period may be longer or the UL measurement accuracy may be worse (or alternatively, the same accuracy may be met at a higher signal quality) when the UL transmissions may be muted. There may also be a pre-defined rule which specifies a maximum number of muted UL transmissions for which a measurement requirement holds.

An exemplary embodiment can be directed to handling uncertain UL measurement occasions due to a Low-Activity State. A UE 220 may be in a low-activity state, e.g., under Discontinuous Reception (DRX) or Discontinuous Transmission (DTX). With the current LTE standard, a UE 220 is allowed to perform UL DTX transmissions autonomously. To avoid undesired or unnecessary UL transmissions, the UE 220 may potentially be configured with DTX, e.g., to avoid transmitting HARQ feedback for DL measurements performed in high-interference environments, unprotected with aggressor ABS subframes which are of poor quality; or for UE 220 energy-saving reasons; or for interference coordination purposes similar to muting. A measuring node 212 is currently not aware of a UE 220 DTX pattern.

When in DRX mode, the UE 220 may not monitor the DL control channel continuously; rather the UE 220 may only monitor the DL control channel during DRX ON (active time) periods, which are configurable. DRX patterns are configured by the network (typically via serving cell). Further, when not in active time, type-0-triggered SRS shall not be reported. Regardless of whether the UE 220 is monitoring PDCCH or not, the UE 220 receives and transmits HARQ feedback and transmits type-1-triggered SRS when expected. The current standard also specifies that a UE 220 may optionally choose to not send type-0-triggered SRS transmissions for up to 4 subframes following a PDCCH indicating a new transmission (UL or DL). After Active Time is stopped due to the reception of a PDCCH or a MAC control element, a UE 220 may optionally choose to continue sending SRS transmissions for up to 4 subframes.

In one embodiment, the measuring node 212 performing UL measurements obtains the information about the low-activity state of the UE device 220 and uses this information for configuring/performing the UL measurements. The information about a low-activity state may comprise, e.g.,

- An indication of whether a low-activity state (e.g., UE DRX and/or UE DTX) is configured for a given UE;
- An indication of whether a low-activity state is configured for any UE served by a given eNodeB;
- A low-activity state configuration (e.g., DRX configuration and/or DTX configuration for various time/frequency resources);
- A pattern or configuration which indicates to the measuring node measurement occasions which are to be used for measurements, wherein the indicated measurement occasions do not include occasions in which the UE is in low-activity state and UL transmissions are dropped;
- A pattern or configuration which indicates to the measuring node measurement occasions which are to be avoided for measurements, wherein the indicated measurement occasions comprise at least occasions in which the UE is in low-activity state and UL transmissions are dropped.

Similarly to the above embodiments, obtaining information about uncertain measurement occasions may be accomplished in one or more different ways, e.g., by any one or combination of cross-layer communication, via internal or proprietary interface; by explicit signaling; and/or autonomously.

There may also be a pre-defined rule specifying that the UL measurement period may be longer or the UL measurement accuracy may be worse (or alternatively, the same accuracy may be met at a higher signal quality) when the UE is in a low-activity state. There may also be a pre-defined rule for different intensities of a low-activity state (e.g., different DRX cycles or different DTX cycles).

An exemplary embodiment can be directed to utilizing enhanced information for enabling UL measurements.

Trigger Type Enhanced Information:

In one embodiment, the UL transmission (e.g., SRS) trigger type (e.g., trigger type 0 or type 1; trigger type 0, type 1 or both) is provided together with the UL transmission (e.g., SRS) configuration information by the configuring node to the positioning node, to an intermediate node (e.g., a gateway or a positioning node, if they further communicate this information to another node), or to the measuring node 212. The information may be provided via cross-layer communication or higher-layer signaling (e.g., via LPPa to the positioning node) or via another node (e.g., via the UE 220 or a network node 206 which may be a positioning node). The information may be further provided by the receiving node (the intermediate node) to the measuring node 212. The trigger type is used by the receiving node to configure and/or to perform UL measurements. The trigger type information may be useful, e.g., when the UL transmission may be configured with different parameters or for a different purpose, depending on the trigger type use. By knowing the trigger type, the receiving node may also know which set of the parameters was used for configuring the UL transmission and can configure the UL measurement accordingly. Further, using a trigger type when the triggering is invoked via low-layer signaling (e.g., using DCI format) may be an indication of a more dynamic configuration/reconfiguration of the UL transmission. Different trigger types may also be characterized with different uncertain UL measurement occasions.

In an alternate embodiment, triggering the UL transmissions for positioning may be restricted to a subset of trigger type, e.g., only higher-layer signaling or only lower-layer signaling may be used for triggering SRS for UL positioning purpose.

Cell Timing Enhanced Information:

The UL transmission configuration is provided per cell to the measuring node 212. However, the measuring node 212 may correctly determine when the signal/channel to be measured has been transmitted only when it knows the timing of that particular cell. A measuring node 212 may also perform measurements for UL transmissions configured in more than one cell; and in a general case, these cells do not have to be synchronized. It may be possible for the measuring node 212 to perform DL measurements and thereby maintain the cell timing information. However, it may be possible that the measuring node 212 is out of DL coverage for a cell while the measuring node 212 is still performing measurements for UL transmissions configured in that cell. For example, referring again to FIG. 3, a measuring node 212 may be out of DL coverage for network cell 204 while still performing UL measurements for UE 228.

Thus, in one embodiment, cell timing is provided together with UL transmission information to the measuring node 212, e.g., by the positioning node or the configuring node. The timing information may be used by the measuring node to determine when in time the configured UL radio signals are transmitted. This timing information is useful since the UL radio signal configuration is determined with respect to a cell timing, e.g., SRS are transmitted every second subframes, and the beginning of UL subframes depend on the cell timing. The cell timing information may comprise absolute timing (e.g., GPS, Global Navigation Satellite System (GNSS), UTC, system time, etc.) or relative timing (e.g., with respect to a reference cell or reference time). An example of relative timing may be a timing offset (e.g., in ns, micro seconds, ms, etc. or in symbols, slots, subframes, etc.). These cell timings can be denoted as UL RTOA Reference Time (since used for determining the time of UL radio signal transmissions for performing UL RTOA measurements. The reference cell may be the cell to which the measuring node is associated). The reference cell may be pre-defined or may be provided to the measuring node 212 together with the cell timing information. In one example, the cell timing of the reference cell may be determined by the measuring node 212, e.g., based on DL measurements.

Neighbor eNodeBs 216 may be aware of cell timing of neighbor cells 202 (e.g., based on the information exchange via X2 or via O&M or SON). Further, an eNodeB 210 may itself be in charge of more than one cell 202 and 204. Accordingly, the measuring node 212 (e.g., LMU) can obtain the cell timing information from a radio network node, e.g., from the cell (or the corresponding eNodeB) with which it is associated. For example, in FIG. 3, a LMU 212 associated with eNodeB 206 may obtain the timing information of cell 204 from eNodeB 216 via UE 228 or positioning node.

The cell timing information for one or more cells may be obtained by the measuring node 212 from another node, e.g., by the positioning node, the configuring node, the controlling node, an intermediate network node (e.g., an LMU gateway) or a radio network node with which the measuring node 212 is associated. The cell timing information may be obtained via higher-layer signaling, cross-layer communication, or an internal or proprietary interface (e.g. between the measuring node and the associated cell/corresponding eNodeB). The cell timing information may be obtained periodically, upon a request, upon an event, after a certain time, or received proactively.

As has been described above, performing measurements in uncertain measurement occasions is more complex and requires more efforts for a measuring node 212. For example, blind searches to determine the presence of the signal to be measured may be required. Some measuring nodes 212 may be capable of doing this, while other measuring nodes 212 may not have this capability.

Thus, in one embodiment, a measuring node 212 maintains its capability information related to its ability to perform UL measurements in uncertain UL measurement occasions. This capability information may be associated with a purpose, e.g., for positioning purpose or for CoMP. This capability information may be provided to another node, e.g., a positioning node, to a radio network node, or to the configuring node (e.g., the NodeB configuring SRS transmissions), directly or via another node (e.g., the configuring node may receive this information from the positioning node, which may in turn receive this information from the measuring node 212). This capability information may also be provided in an UL transmission configuration request or indication message indicating the need for UL transmissions. The configuring node, receiving this capability information may configure UL transmissions based on the capability information, e.g., if the measuring node 212 does not support or prefers to avoid uncertain measurement occasions, the configuring node can configure UL transmissions where the measuring node 212 can be certain about the presence of the pre-scheduled UL transmissions (e.g., no blind search or detection is needed). Exemplary methods for obtaining such UL transmission configurations for avoiding or minimizing uncertain measurement occasions have been described above.

According to another embodiment, the measuring node 212 obtains the information about uncertain UL measurement occasions. This information may be used by the measuring node 212 to avoid the uncertain UL measurement occasions or to use a different scheme for handling measurement samples in UL measurement occasions which may be uncertain UL measurement occasions (e.g., assigning different weights). Some examples of such information are described above, where the information was differentiated by the cause of uncertain UL measurement occasions. In another example, the information about the uncertain measurement occasions does not differentiate among the causes. Instead, the measuring node 212 obtains the information about uncertain UL measurement occasions which may be due to any one or more reasons (the reasons/causes may or may not be known to the measuring node 212). Methods of obtaining/providing such information can be similar to those techniques described above.

In one example, the information about uncertain measurement occasions may comprise a pattern. Such information and patterns may be obtained in one or more different ways, e.g., by any one or combination of cross-layer communication, via internal or proprietary interface; by explicit signaling; autonomously; according to a pre-defined rule; and/or provided via signaling by another node (e.g., a positioning node, an associated cell/node, a gateway node, etc.).

An exemplary pattern may further comprise, e.g.,

A pattern or configuration which indicates to the measuring node measurement occasions (time and/or frequency resources) which are to be used for UL measurements, wherein the indicated measurement occasions do not include uncertain UL measurement occasions; or A pattern or configuration which indicates to the measuring node measurement occasions (time and/or frequency resources) which are to be avoided for UL measurements, wherein the indicated measurement occasions comprise uncertain UL measurement occasions.

The patterns may be a sequence of binary indicators, or may be characterized, e.g., by any one or more of: periodicity, applicability to a subset of time resources (e.g., even subframes or radio frames, or odd subframes or radio frames), reference starting time, bandwidth, frequency, applicability to a subset of frequency resources (e.g., subcarriers; for example, even or odd subcarriers), etc. A pre-defined rule may exist to relate the pattern for the PCell to a pattern of a SCell, e.g., the same pattern may apply for PCell and SCell. One or more such patterns may be provided to the measuring nodes.

There may also be pre-defined rule (e.g., a requirement) for defining such patterns. For example, at least N measurement occasions should still be available for UL measurements within a certain time T, or at least M measurement occasions should not be uncertain UL measurement occasions within a certain time T, or out of a total of K pre-scheduled UL measurement occasions. These patterns may be cell-specific or UE-specific. The patterns may be used as a mask or to create a mask, which may be a binary pattern. The mask may be applied to patterns comprised of pre-scheduled UL transmissions. The measuring node 212 may use a binary operation for the mask and the binary-version of the pattern comprised of the pre-scheduled UL transmissions to determine the time and/or frequency resources to be used by the measuring node 212 for performing the UL measurements. The information about uncertain UL measurement occasions may be provided together with the UL transmission configuration or in a separate message.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method in a measuring node for enhancing uplink measurement performance, wherein the uplink measurement is a measurement performed on radio signals configured for a wireless device by a first network node in a communication network, and wherein the first network node is different from the measuring node, the method comprising:
   obtaining information about a plurality of measurement occasions in which the wireless device is scheduled to transmit one or more configured radio signals, wherein a measurement occasion comprises one or more time and/or frequency resources;
   obtaining information about one or more uncertain measurement occasions, wherein an uncertain measurement occasion comprises one of the plurality of measurement occasions in which the wireless device may or may not transmit the one or more configured radio signals;
   selectively performing a radio signal measurement based on the obtained information and the radio signals received from the wireless device; and
   using the radio signal measurement for determining positioning of the wireless device.

2. The method of claim 1, wherein obtaining information comprises one or more of:
   obtaining information via cross-layer communication;
   obtaining information via an internal or a proprietary interface;
   obtaining information via signaling from a second network node; and
   obtaining information autonomously.

3. The method of claim 1, wherein a maximum number of the uncertain measurement occasions is pre-defined.

4. The method of claim 1, wherein the first network node comprises a positioning node, and wherein determining the positioning of the wireless device comprises determining the positioning via the positioning node.

5. The method of claim 1, wherein the measuring node comprises a location measurement unit (LMU).

6. The method of claim 1, wherein the one or more configured radio signals comprise Sounding Reference Signals (SRS).

7. The method of claim 1, wherein selectively performing the radio signal measurement comprises at least one of:
   deciding not to receive the radio signals during the uncertain measurement occasions;
   receiving the radio signals, but not performing the radio signal measurement based on the received radio signals during the uncertain measurement occasions; and
   assigning a lower weight to the received radio signals received during the uncertain measurement occasions.

8. The method of claim 1, wherein the uncertain measurement occasions comprise one or more of:
   an occasion when the wireless device is configured with a measurement gap and therefore does not transmit a configured uplink radio signal;
   an occasion when the wireless device configures an autonomous gap and therefore does not transmit a configured uplink radio signal;
   an occasion when the wireless device is in a low-activity state and therefore does not transmit a configured uplink radio signal;
   an occasion when the wireless device transmits over an uplink data channel or an uplink control channel and therefore does not transmit a configured uplink radio signal; and
   an occasion when the wireless device mutes a configured uplink radio signal to reduce its interference.

9. The method of claim 8, wherein a maximum number of disturbed uplink transmissions is pre-defined.

10. The method of claim 1, wherein the obtained information about the uncertain measurement occasions comprises one or more of:
    information indicating whether any measurement gaps are configured, reconfigured, used, or no longer used for the wireless device;
    information indicating whether measurement gaps are configured for any wireless device served by the first network node;
    information indicating that on-going measurements may require measurement gaps;
    information of a pre-determined measurement gap pattern configured for the wireless device;
    information of a pattern or configuration indicating occasions which are to be used for measurements because the indicated measurement occasions do not include measurement occasions that may be disturbed due to measurement gaps configured for the wireless device;
    information of a pattern or configuration indicating occasions which are to be avoided for measurements because the indicated measurement occasions comprise measurement occasions that may be disturbed due to measurement gaps configured for the wireless device;
    information indicating whether any scheduled measurement gaps may affect the uplink transmissions from the wireless device; and
    information about the wireless device's capability to perform inter-frequency or inter-Radio Access Technology (inter-RAT) measurements without measurement gaps.

11. The method of claim 1, wherein the obtained information includes a trigger type and wherein the selective radio signal measurement is based on the trigger type.

12. The method of claim 1, further comprising scheduling the transmission of the configured radio signals so that the uncertain measurement occasions are reduced or avoided.

13. The method of claim 1, wherein selectively performing the radio signal measurement comprises not measuring the radio signals received from the wireless device when the wireless device is performing a Physical Uplink Shared Channel (PUSCH) transmission or a Physical Uplink Control Channel (PUCCH) transmission.

14. The method of claim 13, wherein selectively performing the radio signal measurement comprises not measuring the radio signals received from the wireless device when the wireless device's radio signals and the PUCCH transmissions coincide in the same subframe.

15. The method of claim 1, wherein selectively performing the radio signal measurement comprises not measuring the radio signals received from the wireless device when the wireless device's uplink transmissions are muted for interference coordination.

16. The method of claim 15, wherein wireless device's uplink transmissions are determined as being muted based on the wireless device's uplink transmit power levels.

17. The method of claim 1, wherein selectively performing the radio signal measurement comprises not measuring the radio signals received from the wireless device when the wireless device is determined to be in a low-activity state.

18. The method of claim 17, wherein the wireless device is determined to be in a low-activity state based on one or more of:
    information indicating whether the wireless device is configured for low-activity operation;

information indicating whether any wireless device served by the first network node is configured for low-activity operation;

information indicating a low-activity state configuration for the wireless device;

information of a pattern or configuration indicating occasions which are to be used for measurements because the indicated measurement occasions do not include measurement occasions in which the wireless device is in a low-activity state and UL transmissions are dropped; and information of a pattern or configuration indicating occasions which are to be avoided for measurements because the indicated measurement occasions comprise measurement occasions in which the wireless device is in a low-activity state and UL transmissions are dropped.

19. The method of claim 1, further comprising:

receiving, at the measuring node, transmission cell timing information for the wireless device; and selectively measuring, at the measuring node, downlink transmission information sent to the wireless device, based on the wireless device's received transmission cell timing information.

20. The method of claim 19, wherein the measuring node is associated with a network cell different from a network cell associated with the wireless device.

21. A measuring node operable in a communication network and configured for enhancing uplink measurement performance, wherein the uplink measurement is a measurement performed on radio signals configured for a wireless device, the measuring node communicating with one or more wireless devices, and wherein the one or more wireless devices are in communication with a first network node, and wherein the first network node is different from the measuring node, comprising:

a processor;
a memory coupled to the processor;
a transceiver coupled to the processor; and
an antenna coupled to the transceiver configured to transmit and receive messages;
wherein the processor is configured to:
obtain information about a plurality of measurement occasions in which the wireless device is scheduled to transmit one or more configured radio signals, wherein a measurement occasion comprises one or more time and/or frequency resources;
obtain information about one or more uncertain measurement occasions, wherein an uncertain measurement occasion comprises one of the plurality of measurement occasions in which the wireless device may or may not transmit the one or more configured radio signals;
selectively perform a radio signal measurement based on the obtained information and the radio signals received from the wireless device; and
use the radio signal measurement for determining positioning of the wireless device.

22. The measuring node of claim 21, wherein the processor, configured to obtain information, is further configured to:
obtain information via cross-layer communication;
obtain information via an internal or a proprietary interface;
obtain information via signaling from a second network node; and
obtain information autonomously.

23. The measuring node of claim 21, wherein a maximum number of the uncertain measurement occasions is pre-defined.

24. The measuring node of claim 21, wherein the measuring node a location measurement unit (LMU).

25. The measuring node of claim 21, wherein the one or more configured radio signals comprise Sounding Reference Signals (SRS).

26. The measuring node of claim 21, wherein the processor, configured to selectively perform the radio signal measurement, is further configured to effect at least one of:

decide not to receive the radio signals during the uncertain measurement occasions;

receive the radio signals, but not performing the radio signal measurement based on the received radio signals during the uncertain measurement occasions; and assign a lower weight to the received radio signals received during the uncertain measurement occasions.

27. The measuring node of claim 21, wherein the uncertain measurement occasions comprise one or more of:

an occasion when the wireless device is configured with a measurement gap and therefore does not transmit a configured uplink radio signal;

an occasion when the wireless device may use an autonomous gap and therefore does not transmit a configured uplink radio signal;

an occasion when the wireless device is in a low-activity state and therefore does not transmit a configured uplink radio signal;

an occasion when the wireless device transmits over an uplink data channel or an uplink control channel and therefore does not transmit a configured uplink radio signal; and an occasion when the wireless device mutes a configured uplink radio signal to reduce its interference.

28. The measuring node of claim 27, wherein a maximum number of disturbed uplink transmissions is pre-defined.

29. The measuring node of claim 21, wherein the obtained information about the uncertain measurement occasions comprises one or more of:

information indicating whether any measurement gaps are configured, reconfigured, used, or no longer used for the wireless device;

information indicating whether measurement gaps are configured for any wireless device served by the first network node;

information indicating that on-going measurements may require measurement gaps;

information of a pre-determined measurement gap pattern configured for the wireless device;

information of a pattern or configuration indicating occasions which are to be used for measurements because the indicated measurement occasions do not include measurement occasions that may be disturbed due to measurement gaps configured for the wireless device;

information of a pattern or configuration indicating occasions which are to be avoided for measurements because the indicated measurement occasions comprise measurement occasions that may be disturbed due to measurement gaps configured for the wireless device;

information indicating whether any scheduled measurement gaps may affect the uplink transmissions from the wireless device; and information about the wireless device's capability to perform inter-frequency or inter-Radio Access Technology (inter-RAT) measurements without measurement gaps.

30. The measuring node of claim 21, wherein the obtained information includes a trigger type and wherein the selective radio signal measurement is based on the trigger type.

31. The measuring node of claim 21, wherein the processor is further configured to schedule the transmission of the configured radio signals so that the uncertain measurement occasions are reduced or avoided.

32. The measuring node of claim 21, wherein the processor is further configured to not measure the radio signals received from the wireless device when the wireless device is performing a Physical Uplink Shared Channel (PUSCH) transmission or a Physical Uplink Control Channel (PUCCH) transmission.

33. The measuring node of claim 32, wherein the processor is further configured to not measure the radio signals received from the wireless device when the wireless device's radio signals and the PUCCH transmissions coincide in the same subframe.

34. The measuring node of claim 21, wherein the processor is further configured to not measure the radio signals received from the wireless device when the wireless device's uplink transmissions are muted for interference coordination.

35. The measuring node of claim 34, wherein wireless device's uplink transmissions are determined as being muted based on the wireless device's uplink transmit power levels.

36. The measuring node of claim 21, wherein the processor is further configured to not measure the radio signals received from the wireless device when the wireless device is determined to be in a low-activity state.

37. The measuring node of claim 36, wherein the wireless device is determined to be in a low-activity state based on one or more of:

information indicating whether the wireless device is configured for low-activity operation;

information indicating whether any wireless device served by the first network node is configured for low-activity operation;

information indicating a low-activity state configuration for the wireless device;

information of a pattern or configuration indicating occasions which are to be used for measurements because the indicated measurement occasions do not include measurement occasions in which the wireless device is in a low-activity state and UL transmissions are dropped; and information of a pattern or configuration indicating occasions which are to be avoided for measurements because the indicated measurement occasions comprise measurement occasions in which the wireless device is in a low-activity state and UL transmissions are dropped.

38. The measuring node of claim 21, wherein the processor is further configured to:

receive, at the measuring node, transmission cell timing information for the wireless device; and selectively measure, at the measuring node, downlink transmission information sent to the wireless device, based on the wireless device's received transmission cell timing information.

39. The measuring node of claim 38, wherein the measuring node is associated with a network cell different from a network cell associated with the wireless device.

* * * * *

UNITED STATES PATENT AND TRADEMARK OFFICE
CERTIFICATE OF CORRECTION

| | | |
|---|---|---|
| PATENT NO. | : 9,253,677 B2 | Page 1 of 1 |
| APPLICATION NO. | : 13/859543 | |
| DATED | : February 2, 2016 | |
| INVENTOR(S) | : Siomina | |

It is certified that error appears in the above-identified patent and that said Letters Patent is hereby corrected as shown below:

Specification

In Column 12, Line 22, delete "(COMP)." and insert -- (CoMP). --, therefor.

In Column 14, Line 6, delete "(COMP)." and insert -- (CoMP). --, therefor.

Claims

In Column 30, Line 5, in Claim 24, delete "node a" and insert -- node is a --, therefor.

Signed and Sealed this
Twenty-fourth Day of May, 2016

Michelle K. Lee
*Director of the United States Patent and Trademark Office*